US009047089B2

(12) United States Patent
Berenson et al.

(10) Patent No.: US 9,047,089 B2
(45) Date of Patent: Jun. 2, 2015

(54) ENERGY-SAVING SYSTEMS AND METHODS FOR UPDATING MEDIA INFORMATION

(71) Applicant: United Video Properties, Inc., Santa Clara, CA (US)

(72) Inventors: Jeffrey N. Berenson, Nashua, NH (US); Paul G. Jensen, Menlo Park, CA (US); Walter R. Klappert, Los Angeles, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 177 days.

(21) Appl. No.: 13/898,135

(22) Filed: May 20, 2013

(65) Prior Publication Data

US 2014/0344289 A1 Nov. 20, 2014

(51) Int. Cl.
*G01F 1/32* (2006.01)
*G06F 1/32* (2006.01)
*G06F 17/30* (2006.01)

(52) U.S. Cl.
CPC ........ *G06F 1/3293* (2013.01); *G06F 17/30038* (2013.01)

(58) Field of Classification Search
USPC .................. 713/300, 320, 321, 323; 455/574; 709/226; 725/116; 707/751
See application file for complete search history.

(56) References Cited

U.S. PATENT DOCUMENTS

| 8,165,644 | B2* | 4/2012 | Syed .............................. 455/574 |
| 2012/0023236 | A1* | 1/2012 | Backholm et al. ............ 709/226 |
| 2012/0030708 | A1* | 2/2012 | Margis et al. .................... 725/38 |
| 2012/0135726 | A1* | 5/2012 | Luna et al. ................. 455/422.1 |
| 2012/0149352 | A1* | 6/2012 | Backholm et al. ............ 455/418 |
| 2012/0278431 | A1* | 11/2012 | Luna ............................. 709/217 |
| 2013/0173756 | A1* | 7/2013 | Luna et al. .................... 709/219 |
| 2013/0205366 | A1* | 8/2013 | Luna et al. ........................ 726/1 |
| 2014/0177497 | A1* | 6/2014 | Backholm et al. ............ 370/311 |

* cited by examiner

*Primary Examiner* — Hung T Vy
(74) *Attorney, Agent, or Firm* — Ropes & Gray LLP

(57) ABSTRACT

Energy-saving methods and systems for updating media information on a media equipment device are provided. An update to media information is received at the media equipment device. Data identifying a weight for the update is retrieved from the storage device. The data may be related to the user's media preferences or viewing history of content associated with the update. A weight is then assigned to the update based on the retrieved data. The assigned update weight is compared to a threshold value which is retrieved from the storage device. If the update weight exceeds the threshold value, the device will switch from a first power mode of operation (e.g., sleep mode) to a higher power mode of operation (e.g., active mode) so that the media information may be updated with the information contained in the received update.

16 Claims, 12 Drawing Sheets

ENERGY-SAVING SYSTEMS AND METHODS FOR UPDATING MEDIA INFORMATION

BACKGROUND OF THE DISCLOSURE

This disclosure relates generally to updating media information on media equipment devices, and is particularly applicable, without limitation, to energy-saving methods and systems for updating media information on media equipment devices.

As media equipment devices, such as set-top boxes (STBs), have become ubiquitous fixtures in many homes, concerns have arisen over the amount of energy consumed by these devices. Indeed, various government initiatives in the United States have been started to promote energy-saving standards and policies that will curb the high amount of energy consumed by these media devices. One reason for the high energy consumption by STBs is that the devices cannot simply be turned off by the user without the risk of missing important updates to media information. This is because STBs are configured to remain responsive to the service provider in order to receive data and service updates. These updates may be intended for updating program schedules, program metadata and program content. However, traditional systems lack an effective mechanism to perform these updates in an energy-efficient manner.

SUMMARY OF THE DISCLOSURE

In view of the foregoing, energy-saving systems and methods for updating media information on a user equipment device are described. The systems and methods described provide for automatically switching the device from a first power mode (e.g., sleep mode, standby mode, power-off mode) to a second power mode (e.g., awake mode, sleep mode, update mode, full-power mode) to perform an update when the received update is intended for media information that is relevant to the user. The relevancy of an update is measured by a weight that is assigned to the update. The update weight is determined based on user data related to the media information to be updated, and the level of relevancy of the update is determined by comparing the update weight to a threshold value. For example, a user equipment device (e.g., STB) in sleep mode may receive from a service provider an update for schedule information of a TV series. If it is determined that the series is frequently watched by the user, the user equipment device may switch from sleep mode to an active mode in order to perform the update. If, however, the series is very rarely watched by the user, the media equipment device may remain in sleep mode and store the received update to be performed at a later time when the device is active.

In some embodiments, the media information to be updated is associated with a particular content source. For example, the content source may be a TV channel. Users who prefer adult programming may more frequently watch shows on HBO than Cartoon Network, and thus, the user equipment device may awake from sleep mode to update information for shows on HBO but postpone updating information for shows on Cartoon Network.

In some embodiments, the systems and methods described may automatically determine when to perform the update based on the viewing history of the content source (e.g., TV channel, internet content provider, cable provider, video-on-demand provider, pay-per-view provider, music source, etc.). Each content source available to the user equipment device may be ranked based on the viewing history, and a weight for each content source may be computed based on the respective ranking. For example, a media equipment device (e.g., STB) may receive media information from content sources HBO, Cartoon Network, and ESPN, among others. The viewing history may be determined for each of these content sources, where it is determined that HBO is the most frequently watched content source, ESPN the second most frequently watched, and Cartoon Network the least frequently watched. Accordingly, program schedule updates to HBO shows may have higher weights than updates for ESPN shows, which, in turn, have higher weights than updates for Cartoon Network shows. The update weight for the respective content source is then compared to a threshold value. If the update weight exceeds the threshold value, the user equipment device (e.g., STB) may be woken from a first power mode (e.g., sleep mode, standby mode) to perform the update. For example, given that the update weight is higher for HBO than ESPN, the user equipment device may be woken from the first power mode (e.g., sleep mode, standby mode) to update an HBO show but not to update an ESPN show.

In some embodiments, the weight for the content source associated with the media information to be updated is not computed locally at the user equipment device (e.g., STB) but rather simply retrieved by cross-referencing the content source with a database of weights, such that the retrieved weight corresponds to the content source in the database. For example, this database may be stored on a user equipment device, wherein entries in the database are inserted and updated via messages sent from a remote server. In another example, the database of weights may reside on a remote server. In this case, the user equipment device would send a request to the server to retrieve the weight from the database.

In addition to the content source, other factors associated with media information may be used to determine the weight for the update. In some embodiments, the systems and methods described may provide for allowing a user to input various preference levels corresponding to various preference attributes of different types of updates. The update weight would then be computed based on the preference level(s) saved for that update. For example, a preference attribute may be an update preference specifying which condition under which to perform an update to media information.

A user may express an update preference by choosing from one of several different update conditions. These update conditions may include, but are not limited to: always performing the update, only performing the update when the media equipment device is awake, customizing conditions for performing the update by allowing the user to express his/her update preferences at a finer granularity of update types, and automatically determining when to perform the update based on user preferences of media in order to reduce power consumption. These update conditions may be selected for different types of media (e.g., media genre, content source, media format, etc.). For example, a user who cares about news may want all news-related updates to always be performed, regardless of whether the user equipment device (e.g., STB) is a first power mode (e.g., sleep mode, standby mode) or a second power mode (e.g., awake mode, active mode). In another example, a user who rarely watches sports may not want the user equipment device to be woken up just to perform a sports-related update, preferring the update to be performed when the user equipment device is already active. In yet another example, a user who only watches a select few TV shows but not much TV in general may want to customize for which individual TV series to always perform updates. In cases where users do not have strong preferences about when to perform updates but are more concerned with reducing energy consumption, the user equipment device may automatically determine, without user input, when to perform updates based on user media preferences (e.g., determined through user ratings, automatically determined by the user equipment device based on user interaction with the device). In these situations, the user equipment device may automatically switch from a first power mode (e.g., sleep mode, standby mode) to a second power mode (e.g., awake mode, active mode) to update information for highly preferred types of media and postpone the updates for less preferred ones.

In addition to preferences for certain update conditions, preferences for updates may also be split up into different update types which are differentiated based on media information they are intended update. These media types may be classified based on various differentiating characteristics at various levels of granularity. These characteristics include, but are not limited to: types of media information (e.g., genre, content source, media format type, etc.), media genre (e.g., news, sports, movies, TV shows, music, etc.), media format (e.g., video-on-demand, broadcast television, audio, etc.), content source (e.g., TV channel, internet content provider, cable provider, music source, etc.), and media asset (e.g., individual episode of a TV show, an individual song, an individual movie, etc.).

Furthermore, categories falling under each of these differentiating characteristics may be a preference attribute of the media information. Each preference attribute may be associated with a preference level, which is assigned to the attribute through user input. For example, a user may provide a rating for a particular category of media genre (e.g., a user rates news-related media 4 stars). In another example, a user may rate a particular category of media format (e.g., video-on-demand) 3 stars and another media format (e.g., broadcast TV) 4 stars. In a more narrow example, a user may rate a particular media asset (e.g., an individual TV episode) 4.5 stars. The preference level for a given preference attribute may also be automatically determined by the user equipment device (e.g., STB) based on a user's viewing, recording, and purchase history. For example, the user equipment device may determine that the user has never missed a single episode of the TV series Walking Dead and assigns a high preference level to the TV series Walking Dead. In another example, the user equipment device may determine that the user schedules recordings of all albums produced by the Beatles. In this case, the device may assign the particular category of music band (e.g., Beatles) a high rating.

The update weight is assigned by one or a combination of some or all of the aforementioned factors (e.g., update preferences based on update condition type, preferences for different types of media information, historical user behavior such as viewing, recording, and purchase history). Once the update weight is assigned, it is compared to a threshold value. This comparison will determine how relevant the update is to the user. In some embodiments, if the update weight does not exceed the threshold value, the update is stored on a storage device, and the media information subject to the update is left unmodified. The power state of the device is then monitored to determine when the device is switched back to the second power mode so that the media equipment device can perform the stored update. For example, the update weight for a program schedule update to a user's rarely watched channel (e.g., Cartoon Network) may not exceed the threshold value. In this case, the media equipment device (e.g., STB) is not switched to a second power mode (e.g., active mode, awake mode, update mode, full-power mode) to perform the update. Rather, the Cartoon Network update is stored on a storage device. When the media equipment device is switched the second power mode, the update will be performed and the program schedule information associated with the Cartoon Network modified to reflect the update. This scheme of conditional updating reduces the amount of energy consumption of the device, because the act of powering-up user equipment devices from a first power mode (e.g., sleep mode, standby mode, power-off mode) to a second power mode (e.g., awake mode, standby mode, full-power mode) may expend considerable energy.

Different conditions may cause the user equipment device to switch to a second power mode of operation, under which postponed updates can be thus performed. These conditions include, but are not limited to: a user request that the device be switched to the second power mode of operation, a message from the server indicating that the media equipment device be switched to the second power mode, and a recording of media content on the device. For example, the user request may be a user manually turning on the user equipment device to browse through programs of interest through a interactive media guide. This action may cause the user equipment (e.g., STB) to switch to a second power mode (e.g., active mode). In another example, a server may send the user equipment device a message to transition to a second power mode (e.g., active mode) at a particular time of day in order to send updates in clusters, rather than in a series of spaced-out transmissions, in order to reduce power consumption of the device. In yet another example, a scheduled recording may also trigger the device to transition to a second power mode (e.g., active mode).

In some embodiments, device characteristics related to power consumption may be used to compute the threshold value with which update weights are compared so that the energy efficiency of the user equipment device may be maximized. For example, if the current power usage of a user equipment device (e.g., STB) is high, the threshold value will be correspondingly high, making the conditions for performing updates more selective.

In some embodiments, the threshold value may be determined based on a current quantity of media information stored on the device. For example, the quantity of media information may be measured based on the amount of storage space currently occupied by the media information. In other embodiments, the quantity of media information may be measured based on the period of time for which the media information is accessible to users of the device. For example, if the user equipment device (e.g., STB) currently holds one month of media information (e.g., program schedule for the next month), the threshold value may be higher than if the user equipment device only holds one week of media information. Accordingly, certain updates are deemed less urgent if a user equipment device holds enough up-to-date media information to last for a longer period of time.

BRIEF DESCRIPTION OF THE DRAWINGS

The above and other features of the present disclosure, its nature and various advantages will be more apparent upon consideration of the following detailed description, taken in conjunction with the accompanying drawings, and in which.

DETAILED DESCRIPTION OF EMBODIMENTS

Figure 1:
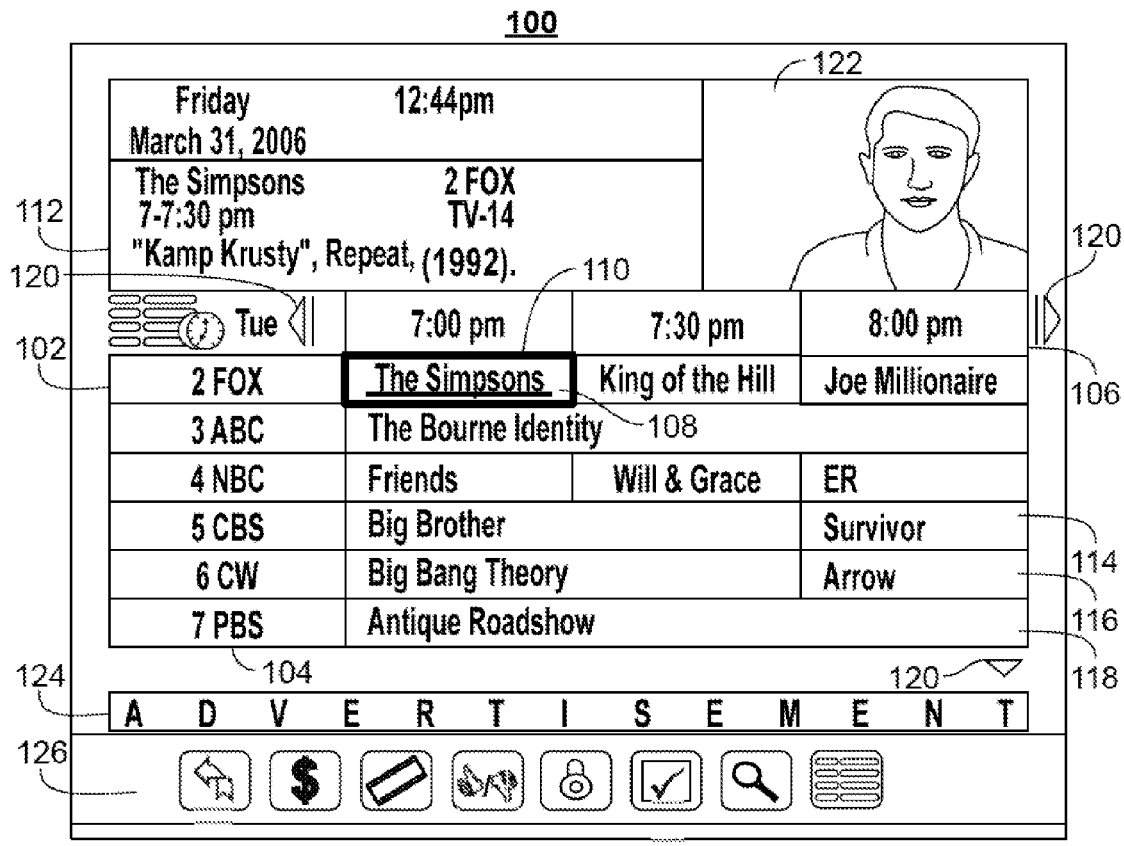
FIG. 1 is a diagram of an interactive grid display in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a set-top box, television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
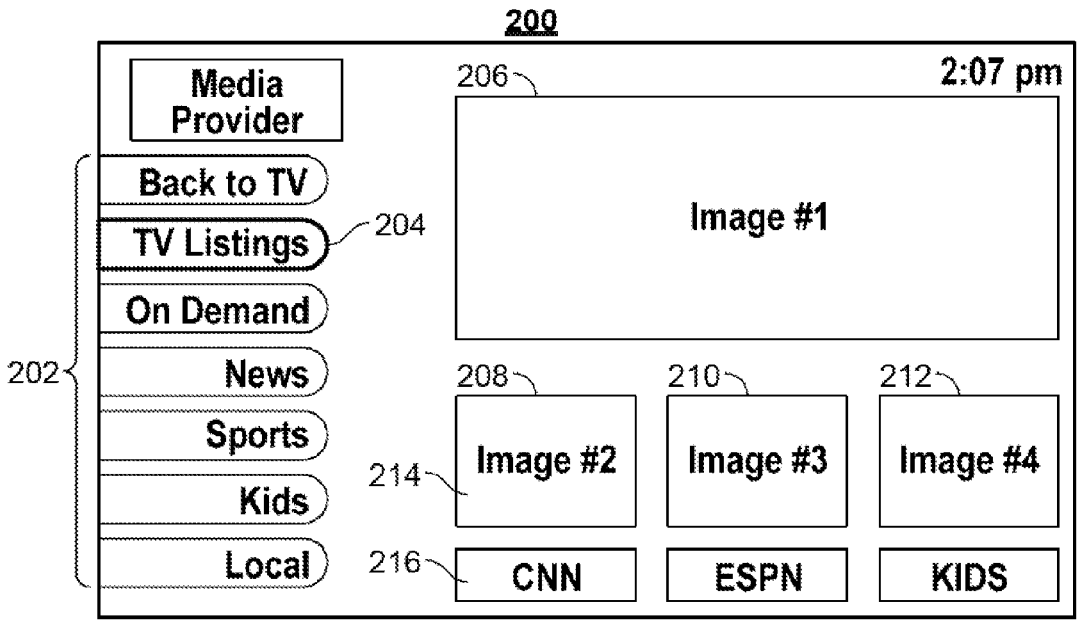
FIG. 2 is a diagram of an interactive media system in accordance with some embodiments of the disclosure.

FIGS. 1-2 show illustrative display screens that may be used to provide media guidance data. The display screens shown in FIGS. 1-2 and 5-7 may be implemented on any suitable user equipment device or platform. While the displays of FIGS. 1-2 and 5-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by genre (e.g., movies, sports, news, children, or other genres of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
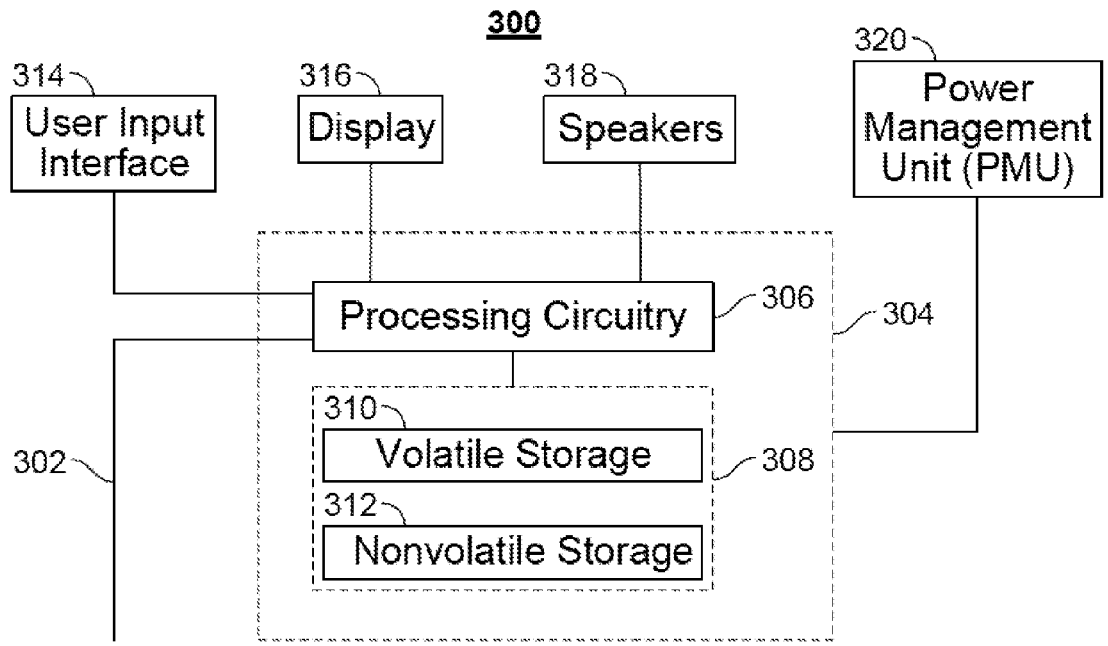
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers, such as remote server 424. As referred to herein, "remote server", "server", "guidance application server", "media server", or any other type of server may be understood to mean any server or device that is remote to user equipment device 300 and communicates with user equipment device 300 over communication network 414. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

In some embodiments, control circuitry 304 is configured to receive updates to media information stored in storage 308 of user equipment device 300. The user equipment device 300 may be a media equipment device. As referred to herein, "update", "update information", "update to media information", "media update", and "update to media" should all be understood to mean a piece of software or information received by control circuitry 304 at user equipment device 300 that is intended to replace, supplement, or modify all or portions of media information stored in storage 308, after which the media information is made more current or complete.

Control circuitry 304 may identify the type of update received by extracting or parsing parts of the update information which contain metadata indicating the update type. Control circuitry 304 may also identify the update type by analyzing the data format of the update type. Once the update type is identified, control circuitry 304 communicates with storage 308 to retrieve data that is associated with the update type in order to determine a weight for the received update. In some embodiments, the data is retrieved by control circuitry 304 from non-volatile storage 312. The retrieved data may include, but are not limited to: preference levels assigned by a user of user equipment device 300 or automatically computed by processing circuitry 306 or 426, viewing history of the media information to be updated as computed by processing circuitry 426 of a remote server 424, and the content source associated with the media information to be updated as identified by control circuitry 304. Once the data is retrieved from storage 308 by control circuitry 304, the retrieved data is passed by control circuitry 304 to processing circuitry 306 which computes a weight for the received update based on the retrieved data. Processing circuitry 306 passes the computed weight for the update back to control circuitry 304. Control circuitry 304 assigns the computed weight to the update and stores it in storage 308. In some embodiments, control circuitry 304 stores the computed weight in volatile storage 310 because it will soon be fetched for comparison with a threshold value.

Control circuitry 304 is also responsible for retrieving a threshold value from storage to be compared with the computed update weight, as described in the previous paragraph. In some embodiments, control circuitry 304 may store the threshold value in non-volatile storage 312 on the user equipment device 300. The threshold value may be computed by processing circuitry 306. Further details about the computation of the threshold value will discussed in connection with FIG. 8. In other embodiments, control circuitry 304 may store the threshold value in a database residing in storage 428 of a remote server 424. In this case, user equipment device 300 communicates with remote server 424 over the communications network 414 in order to retrieve, by control circuitry 304, the threshold value from the remote storage 428. In some embodiments, user equipment device 300 sends a request to remote server 424 to retrieve the threshold value. In other embodiments, remote server 424 periodically sends user equipment device 300 the most recently computed threshold value, where the threshold value was computed by processing circuitry 426 of remote server 424. Control circuitry 304 then temporarily stores the retrieved threshold in volatile storage 310 of user equipment device 300.

Control circuitry 304 fetches both the weight that was previously assigned to the received update and the retrieved threshold value from volatile storage 312 and passes the two values to processing circuitry 306 to be compared. If the assigned weight for the update exceeds the retrieved threshold value, control circuitry 304 may instruct power management unit (PMU) 320 to switch user equipment device 300 from a first power mode of operation to a second power mode of operation. Alternatively, PMU 320 may receive instructions to perform the switching directly over communications network 414. For example, remote server 424 may send PMU 320 a message telling it to switch user equipment device 300 from a first power mode to a second power mode.

As referred to herein, a first power mode may be a low power mode of operation. A first power mode may be understood to be a sleep mode, a standby mode, a power-off mode, a dormant mode, or a low-power mode. A low-power mode may refer to a mode of operation wherein user equipment device 300 has sufficient power to perform basic computation (e.g., compute whether an update should be performed) using processing circuitry 306 but insufficient power to perform more power-intensive tasks such as communicate with remote devices 424 over communications network 414. As referred to herein, a second power mode may be a high power mode of operation. A second power mode may be understood to be an awake mode, an active mode, a full-power mode, a high-power mode, or an update mode, where a device operating at a second power mode has sufficient power to perform an update to media information. On the other hand, a device operating at a first power mode may not have enough power to perform an update and therefore may need to be switched to a second power mode to update the media information. A device operating at a second power mode may consume more power than at a first power mode. In some embodiments, device 300 may operate at a third power mode, wherein the power consumed at the third power mode is greater than that consumed at the first power mode but less than that consumed at the second power mode. A third power mode may be an update mode, wherein device 300 operates at enough power to perform updates but not at full-power mode to transmit program information for a user to view. A third power mode may also refer to a low-power mode, as described above. All three modes of operation (e.g., first power mode, second power mode, third power mode) may be used interchangeably within the present disclosure.

Once user equipment device 300 is switched to a second power mode of operation, control circuitry 304 updates the media information stored in storage 308 based on the received update. As referred to herein, switching refers to activating a component of circuitry within user equipment device 300 that corresponds to a desired power mode of operation. Switching may be performed by PMU 320 to switch user equipment device 300 from a first power mode to a second power mode. A first power mode may correspond to a first circuitry component, and a second power mode may correspond to a second circuitry component. As referred to herein, switching from a first power mode to a second power mode involves deactivating the first circuitry component and activating a second circuitry component.

PMU 320 monitors and manages the power consumption of user equipment device 300. PMU 320 may be configured to monitor the current level of power consumption of user equipment device 300 based on device characteristics such as, but are not limited to, battery usage information, screen brightness, screen saver settings, central processing unit (CPU) power usage, graphic processing unit (GPU) power usage, integrated processor power usage, number of applications currently running on user equipment device 300, number and frequency of recordings scheduled to be performed on user equipment device 300, and the current power mode of operation (e.g., first power mode, second power mode). More specifically, PMU 320 monitors the power state of user equipment device 300 to determine when device 300 switches from a first power mode to a second power mode. In some embodiments, PMU 320 may reside on user equipment device 300 as a component of control circuitry 304. In other embodiments, PMU 320 may be a unit that is external to user equipment device 300. In these cases, PMU 320 may communicate with user equipment device 300 by sending and receiving instructions from control circuitry 304.

PMU 320 may perform the switching in response to various conditions, based on instructions from control circuitry 304. In some embodiments, control circuitry 304 dynamically determines whether the switching should be performed by comparing the weight for an update with a threshold value that is computed by processing circuitry 306 based on one or a combination of some or all of the power characteristics described above. If the update weight exceeds the threshold value, control circuitry 304 may instruct PMU 320 to switch user equipment device 300 from a first power mode to a second power mode.

In other embodiments, control circuitry 304 may receive an indication to switch user equipment device 300 from a first power mode to a second power mode. For example, control circuitry 304 may receive a request from a user input interface 314 to perform the switching. In another example, control circuitry 304 may receive over communications network 414 via path 302 a message from remote server 424 indicating that user equipment device 300 should be switched to a second power mode of operation. In yet another example, control circuitry 304 may receive a request to record a media asset on user equipment device 300. In each of the aforementioned examples, control circuitry 304 may instruct PMU 320 to switch user equipment device 300 to a second power mode of operation in response to the requests and messages received. These messages and/or requests may include a time field which indicates a future time at which control circuitry 304 should switch device 300 to a second power mode to receive updates over network 414 and/or perform updates that are stored in storage 308. This time field may set a timer to switch user device 300 to a second power mode at a specified time. The time field may also set a timer to switch user device 300 to a first power mode at a specified time period when no updates will be sent to device 300.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above.

Storage 308 may include volatile storage 310 and nonvolatile storage 312. Nonvolatile storage 312 may be used to launch a boot-up routine and other instructions. Cloud-based storage, described in relation to FIG. 4, may be used to supplement storage 308 or instead of storage 308.

In some embodiments, control circuitry 304 may store media information in volatile storage 310 when user equipment device 300 is in a second power mode. This is because storage 308 may not include a hard disk or sufficient nonvolatile memory to store the entire set of media information obtained by user equipment device 300. Even when storage 308 includes nonvolatile storage 312, storing certain types of media information or copies of that media information (e.g., program schedule information) in volatile storage 310 may be desirable because the information may be retrieved faster than data stored in nonvolatile storage 312. However, the disadvantage of storing media information in volatile storage 310 is that the stored information will be lost when user equipment device 300 shuts down and no longer has power. In such cases, control circuitry 304 may instruct all or portions of media information stored in volatile storage 310 to be stored in nonvolatile storage 312. These instructions to transfer information from volatile to nonvolatile storage may be triggered by communication from PMU 320 to control circuitry 304. In some embodiments, PMU 320 monitors the power consumption level of user equipment device 300 and communicates with control circuitry 304 when the battery level of user equipment device 300 is low or before switching user equipment device 300 to power-off mode.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 318. User input interface 318 may be any suitable user interface, such as a remote control, mouse, trackball, keypad, keyboard, touch screen, touchpad, stylus input, joystick, voice recognition interface, electroencephalography (EEG) interface, or other user input interfaces. User input interface 318 may be configured to receive preferences from a user of user equipment device 300. These preferences may include update preferences or preferences for various types of media information. Update preferences refer to the user's preferences for when to perform updates for a given type of media information to be updated. These preference categories may be presented to the user on display 315. User input interface 318 may also be configured to receive user ratings for previously viewed media content. The media content to be rated may also be presented to the user on display 315. Further details about user selection of update preferences will be provided during discussion of FIGS. 5, 6, and 7.

Display 316 may be provided as a stand-alone device or integrated with other elements of user equipment device 300. Display 316 may be one or more of a monitor, a television, a liquid crystal display (LCD) for a mobile device, or any other suitable equipment for displaying visual images. In some embodiments, display 316 may be HDTV-capable. In some embodiments, display 316 may be a 3D display, and the interactive media guidance application and any suitable content may be displayed in 3D. A video card or graphics card may generate the output to the display 316. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 318 may be provided as integrated with other elements of user equipment device 300 or may be stand-alone units. The audio component of videos and other content displayed on display 316 may be played through speakers 318. In some embodiments, the audio may be distributed to a receiver (not shown), which processes and outputs the audio via speakers 318.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
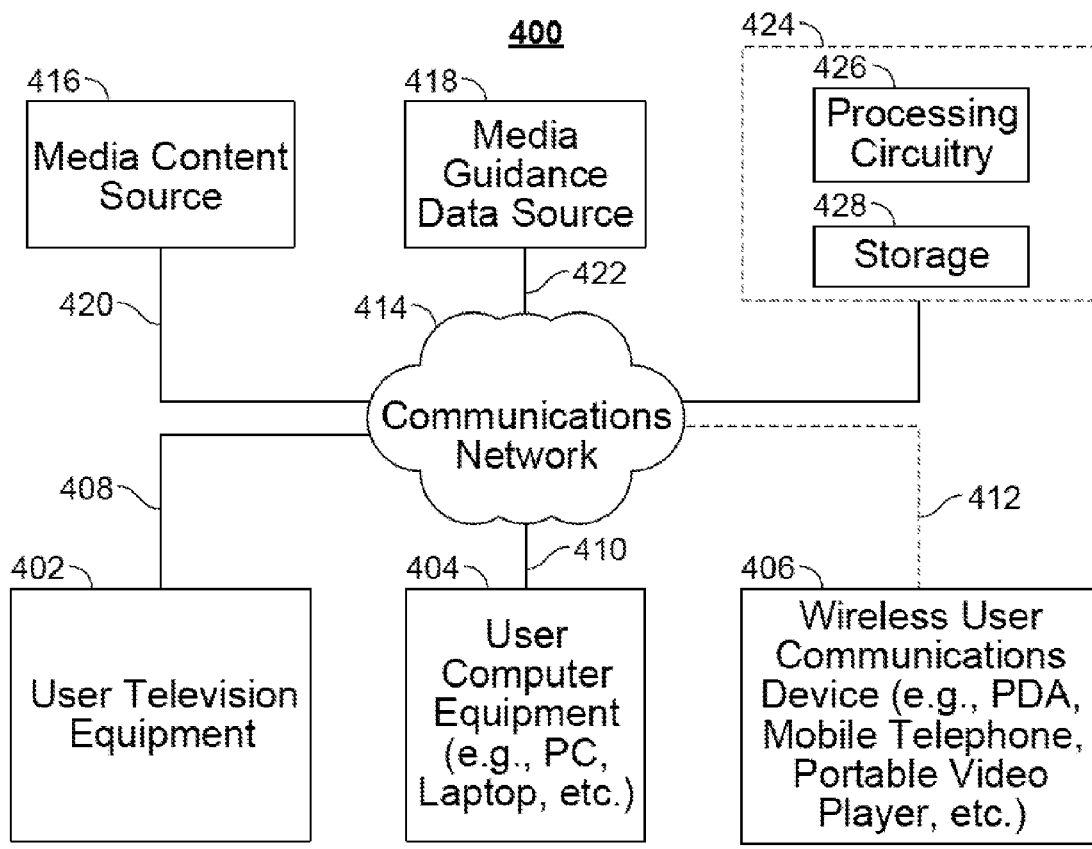
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412. Media guidance data source 418 may communicate with remote server 424 over communication network 414.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Media guidance data source 418 may also send updates to one or more user equipment devices 402, 404, and 406 over communications network 414 to update media information in their storage 308. These updates may include, but are not limited to, updates to schedules for the media information, updates to metadata associated with media, and scheduled recordings of media. In some embodiments, media guidance data source 418 may send updates periodically based on a time schedule (e.g., once a week, once a day, once every 12 hours, etc.).

Media guidance data source 418 may also send updates in response to receiving a request from user equipment devices 402, 404, and/or 406 for an update. In some instances, these requests for an update may be initiated when media information has been lost or damaged in storage 308 of the user equipment device. In other instances, these requests may be initiated when the media information stored in storage 308 is running low (e.g., the stored media information is only applicable for one more day). In another instance, these requests may also be initiated if storage space in storage 308 increases.

The requests may also be initiated by user equipment devices 402, 404, and/or 406 based on an update schedule determined by PMU 320 on the device. For example, PMU 320 may instruct control circuitry 304 to request an update to media information some time before switching user equipment device 300 to a sleep or power-off mode, under which the device 300 will no longer be able to perform updates. This way, updates to media information may be performed in clumps of time while the user equipment device 300 is still in an active mode. Clustered updates may be advantageous because it reduces the start-up energy costs of sporadically waking the user equipment device 300 from a sleep mode to an active mode in order to perform an update.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In other embodiments, media guidance data source 418 may send media guidance data to one or more remote servers 424, which may or may not reside on a cloud network. Guidance data may include user information related to the data. For example, guidance data may include viewing information of a particular media asset, content source, or categories of media. Guidance data may also include user preference information for media which correspond to one or more users. Media guidance data source 418 may send these guidance data to one or more remote servers 424 over communications network 414 to be stored in one or more remote storages 428.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server 424. For example, media guidance applications may be implemented partially as a client application on control circuitry 304 of user equipment device 300 and partially on a remote server 424 as a server application (e.g., media guidance data source 418) running on control circuitry of the remote server 424. When executed by control circuitry of the remote server 424 (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

In some embodiments, media guidance system 400 may also include a remote server 424 which communicates over communications network 414 with one or more user equipment devices 402, 404, and 406. Remote server 424 has its own processing circuitry 426 and storage 428. Similar to processing circuitry 306 of user equipment device 300, processing circuitry 426 of remote server 424 may be used to compute a threshold value. Processing circuitry 306 or 426 may also be used to compute a weight value which is used to determine the weight assigned to an update. In some instances, the computed weights may be computed by processing circuitry 306 or 426 based on an aggregate viewing history of an entire viewing audience for a particular media content source 416. For example, if the number of viewers over the last week for all programs airing on ABC is higher than that of NBC, processing circuitry 306 or 426 may assign a higher weight to ABC content source than the NBC content source. The weights associated with various media content sources may be stored in a database residing in storage 428. In some embodiments, user equipment devices 402, 404, and 406 may be able to retrieve these weights by sending a request to remote server 424. In other embodiments, remote server 424 may periodically send messages to user equipment devices 402, 404, and 406 with updated values for the weights stored in the database in storage 428.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

User equipment devices may consume a lot of power as they may constantly be operating at a high power mode (e.g., active mode, full-power mode) in order to receive and perform updates from media guidance data sources. In some instances, a user may wish to have a user equipment device 300 that operates in a more energy-efficient manner. As described herein, energy-saving methods and systems may be employed to reduce power consumption of user equipment device 300 by selectively switching device 300 from a first power mode to a second power mode to perform an update only when the update contains information that is deemed relevant to the user.

Figure 5:
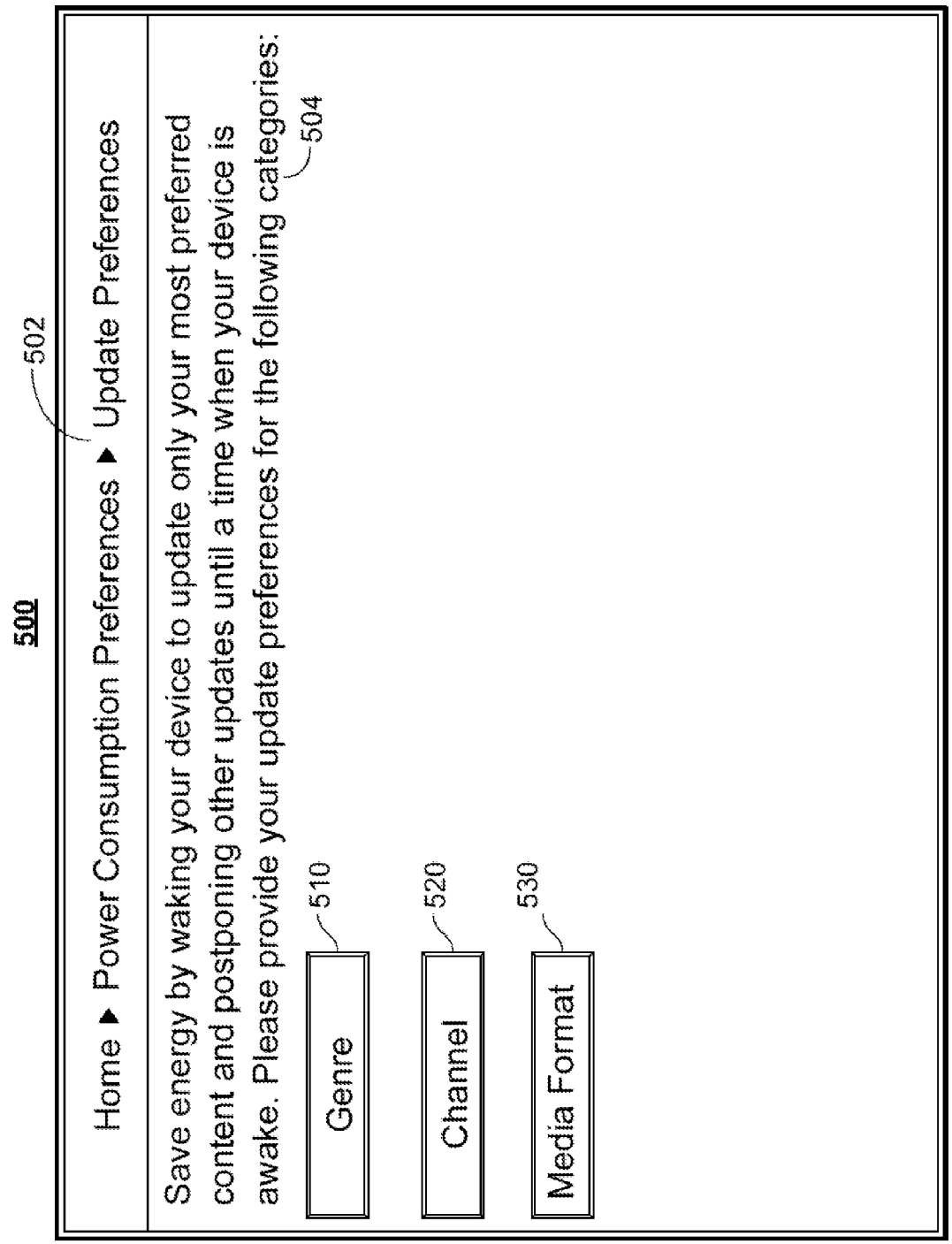
FIG. 5 is an illustrative start screen showing options for providing update preferences for different types of media information in accordance with some embodiments of the disclosure.

FIG. 5 is an illustrative start screen 500 displayed on display 316 showing options for providing user update preferences for different types of media information in accordance with some embodiments of the disclosure. This start screen 500 provides a user of media equipment device 300 with an entry point into choosing update conditions for various types of media information, as will be further discussed in relation to FIG. 6.

Title 502 of screen 500 provides the user with a context for providing update preferences. Illustrative title 502 indicates to the user of user equipment device 300 that the update preferences are a subset of power consumption preferences. Illustrative instructions 504 for interacting with screen 500 show how update preferences are related to power consumption by elaborating on the purpose of providing update preferences. More specifically, instructions 504 indicate that the user's update preferences will be used save energy consumption, because user equipment device 300 will only be woken from standby mode (e.g., first power mode) to perform updates to a user's most preferred content, as determined through the update preferences, whereas updates to less preferred content will be postponed until a time when user equipment device 300 is awake (e.g., second power mode).

Update preferences are broken down into different types of media information to be updated. Illustrative examples of such types of media are shown by options 510 (media genre), 520 (media channel), and 530 (media format) in FIG. 5. Though FIG. 5 only shows three media type options 510, 520, and 530, screen 500 may be populated with any number of media type options. These media type options may include, but are not be limited to, media genre (e.g., news, sports, movies, TV shows, music), media channel (e.g., ABC, NBC, ESPN), media content source (e.g., TV channel, internet content provider, music streaming source, etc.), media format (e.g., video-on-demand, pay-per-view, broadcast TV, audio), and media asset (e.g., TV episode, a movie, a song, an album, etc.). Control circuitry 304 may receive a user's update preference(s) via user selection of one or more media type options, as illustrated by options 510, 520, and 530. For example, control circuitry 304 may receive a user selection of media genre option 510. In response to receiving user selection of option 510, control circuitry 304 may instruct display 316 to display another screen configured to receive user selection of different update conditions for updating media information of different genres.

Figure 6:
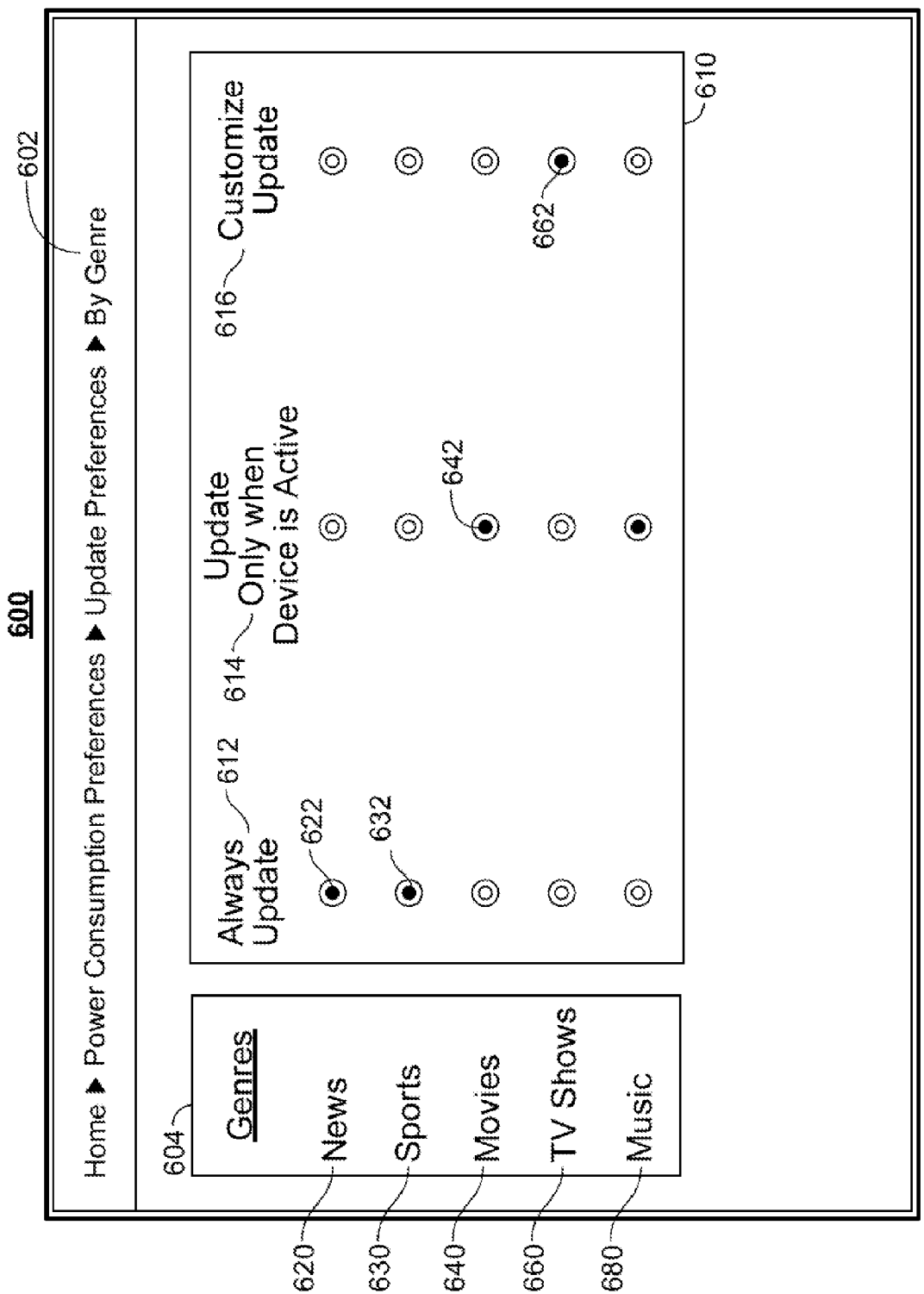
FIG. 6 is an illustrative screen showing options for user update preferences for a particular type of media information in accordance with some embodiments of the disclosure.

FIG. 6 shows such a screen 600. Control circuitry 304 displays illustrative screen 600 on display 316, which shows options for selecting various conditions 612, 614, and 616 for updating different genres of media information, as indicated by the screen title 602. While screen 600 only shows genre types 620, 630, 640, 660, and 680, screen 600 may alternatively display any other type of media information (not shown). For example, control circuitry 304 may receive a user selection of the channel option 520 displayed on screen 500. In response to receiving said user selection through user input interface 314 of option 520, control circuitry 304 may instruct display 316 to transition from start screen 500 to another screen similar to screen 600, where the genre region 604 would be replaced by a channel region (not shown) populated by various channels accessible to user equipment device 300. Similarly, control circuitry 304 may receive user selection of option 530. In response to receiving said selection of option 530, control circuitry 304 may display another screen similar to screen 600, where the genre region 604 would be replaced by a media format region (not shown) populated by various formats of media (e.g., broadcast TV, video-on-demand, pay-per-view, audio, etc.) received by user equipment device 300.

For each genre type, control circuitry 304 may be configured to receive user selection of an update condition. Three illustrative update conditions 612, 614, and 616 are shown in region 610 of screen 600, but control circuitry 304 may display different update conditions, more update conditions, or fewer updates conditions that those shown in FIG. 6. In response to receiving user selection of an update condition, control circuitry 304 may store the selection in storage 308. Examples of these user selections are shown by selections 622, 642, and 662. In some embodiments, control circuitry 304 may store the selection in volatile storage 310 so that control circuitry 304 may more quickly fetch the stored selection at a later time. In other embodiments, control circuitry 304 may store the selection in nonvolatile storage 312 so that they will persist even when media equipment device 300 loses power.

Update condition 612 specifies that an update will always be performed for a corresponding category (e.g., 620, 630, 640, 660, 680) of media type, regardless of the current power mode of user equipment device 300. For example, control circuitry 304 may receive user selection 622 of update condition 612 from user input interface 314 by a user for media information falling under the news genre category 620. The selection 622 may be made by a user who cares about keeping all news-related media information up-to-date on user equipment device 300. In this case, control circuitry 304 may receive an update for news-related information from media guidance data source 418 while user equipment device 300 is operating a first power mode (e.g., sleep mode, standby mode). In response to receiving said update, control circuitry 304 may instruct PMU 320 to switch device 300 to a second power mode so that the update can be performed.

Update condition type 614 specifies that an update may only be performed for a corresponding category (e.g., 620, 630, 640, 660, 680) of media type when user equipment device 300 is operating at a second power mode (e.g., awake mode, active mode, full-power mode, update mode). For example, control circuitry 304 may receive user selection 642 of update condition 614 for media information falling under movie genre category 640. Selection 642 may be made by a user who rarely watches movies and would rather reduce energy consumption than keep movie information (e.g., schedules, metadata) the most up-to-date. In this case, control circuitry 304 may receive an update for movie information from media guidance data source 418 while device 300 is operating at a first power mode (e.g., sleep mode, standby mode). In response to receiving said update, control circuitry 304 may not instruct PMU 320 to switch device 300 to a second power mode (e.g., awake mode, active mode, full-power mode, update mode) to perform the update. Instead, control circuitry 304 may store the movie-related update in storage 308 and postpone the update to a time when device 300 is operating at a second power mode.

Update condition 616 specifies that an update may either always be performed (e.g., update condition 612) or only performed when the device 300 is operating at a second power mode (e.g., update condition 614), depending on customized update conditions selected by the user for particular media assets within a corresponding category of media type. For example, control circuitry 304 may receive a user selection 662 of update condition 616 from user input interface 314 for media information falling under the TV shows genre category 660. Selection 662 may be made by a user who does not watch that many TV shows but is devoted to watching only a select few. In response to receiving selection 662, control circuitry 304 may instruct display 316 to transition from screen 600 to another screen (not shown), which may display options for a user to customize update conditions for particular TV shows. This other screen may look similar to screen 600, but the media category region, represented by the genre region 604, may be replaced with a media asset region (e.g., different TV shows). In some embodiments, control circuitry 304 may instruct display 316 to display all TV show media assets made available to user equipment device 300. In some instances, control circuitry 304 may instruct display 316 to display a list of TV shows, where the TV shows are alphabetically listed. In other instances, control circuitry 304 may instruct display 316 to display a list of TV shows that are organized by how recently a TV show has been viewed or how highly that TV show has been rated, as determined by control circuitry 304. In other embodiments, control circuitry 304 may only instruct display 316 to display only the most recently viewed or highly rated to the user.

In some instances, control circuitry 304 may receive an update to media information pertaining to a particular media asset. In response to receiving said update, control circuitry 304 may parse the information contained in the update to identify what type of media information the update is intended for. For example, the update information may contain a tag (e.g., metadata tag) that specifies that the media information to be updated relates to a particular media asset (e.g., TV show). Control circuitry 304 may parse the tag to identify the particular media asset. In response to identifying the media asset, control circuitry 304 may communicate with storage 308 to determine whether user selection of an update condition (e.g., 612, 614, 616) is stored for the identified media asset. Control circuitry 304 may determine that such a update condition selection exists. In response to determining that the update conditions exists in storage 308, control circuitry 304 may or may not perform the update depending on which stored update condition selection is stored and the current power mode of the device (e.g., first power mode, second power mode). For example, control circuitry 304 may determine that the stored selection is for update condition 612 ("always update"). In response to determining that selection for update condition 612 was stored for a particular media asset (e.g., an episode of a TV show), control circuitry 304 may perform the update to the media asset, regardless of the current power mode of user equipment device 300. In another example, control circuitry 304 may determine that the stored selection is update condition 614 ("update only when device is active"). In response to determining that selection for update condition 614 is stored in storage 308, control circuitry 304 may first communicate with PMU 320 to determine what the current power mode is. In some cases, control circuitry 304 may determine that the current power mode is a first power mode (e.g., sleep mode, standby mode). In response to determining that the current power mode is a first power mode, control circuitry 304 may postpone the update and store the update information in storage 308 to be fetched later.

In some cases, control circuitry 304 may determine that a selection for an update condition is not stored in storage 308 for the particular media asset that is associated with the media information to be updated. In response to determining that the selection is not stored, control circuitry 304 may dynamically determine whether to perform the update based on factors such as other user data (e.g., user preferences for various media, user ratings for various media) stored in storage 308 and/or power consumption characteristics of user equipment device 300, as monitored and measured by PMU 320. Such dynamic determination will be more extensively discussed in connection to the flow-charts shown in FIGS. 8-10.

In some cases, control circuitry 304 may receive user selection of update conditions which conflict with each other when applied to a same media asset. For example, control circuitry 304 may receive an update to scheduling information for a media asset (e.g., the football movie "Remember the Titans") which falls under more than one media genre category (e.g., sports 620, movies 630). As shown in FIG. 6, control circuitry 304 may have received and subsequently stored in storage 308 user selection 632 for update condition 612 ("always update") for updating media falling under the sports genre category 630. Additionally, control circuitry 304 may also have received and stored in storage 308 user selection 642 of update condition 614 ("update only when device is active") for media falling under the movies genre category 640. Control circuitry 304 may determine that the media asset (e.g., the football movie "Remember the Titans") falls under both the sports genre category 630 and movies genre category 630. In response to said category determination, control circuitry 304 may determine that the update conditions for the two categories conflict with each other. For example, control circuitry 304 may have received the update while the user equipment device was operating in a first power mode (e.g., sleep mode, standby mode). In such cases where a conflict in update conditions exists for updating a given media asset, control circuitry 304 may employ a conflict resolution policy.

In one embodiment, control circuitry 304 resolves the conflict by imposing a priority on different update conditions types (e.g., update conditions 612 and 614). For example, control circuitry 304 may employ a "better safe than sorry" policy by always giving more weight to update condition 612 ("always update") than update condition 614 ("only update when device is active"). This way, the user of user equipment device 300 does not accidentally miss updates for media that are subject to conflicting update conditions. In this case, control circuitry 304 may determine that an update to a media asset (e.g. the football movie "Remember the Titans") that is potentially subject to conflicting update conditions will always be performed. For example, control circuitry 304 may always perform an update to the media asset (e.g., "Remember the Titans") because control circuitry 304 employs a policy where update condition 612 for one of the media genre categories (e.g., sports 630) always trumps the other update condition 614 for another media genre category (e.g., movies 640).

Alternatively, in a second embodiment, control circuitry 304 may employ an energy conservation policy by always giving more weight to update condition 614. In these embodiments, control circuitry 304 may only perform the update to the media asset (e.g., "Remember the Titans") if it determines that user equipment device 300 is in a second power mode (e.g., awake mode, active mode, full-power mode, update mode) because the movie is classified under the movie category that is subject to update condition 614, which trumps any other update condition.

In a third embodiment, which may be combined with either of the first or second embodiments, control circuitry 304 may resolve the conflict by imposing a priority on media categories, instead of on update conditions, as described above. In some cases, control circuitry 304 may monitor which types of media information are most frequently consumed by the user and prioritizes the categories accordingly, where a higher viewing frequency corresponds to a higher ranking. In other cases, control circuitry 304 may fetch user ratings from storage 308 and instruct processing circuitry 306 to compute an average of user ratings for a given media category based on the fetched user ratings. Further details about assignment of user ratings are discussed in connection with FIG. 7. In these cases, control circuitry 304 may prioritize a first media category with a high average user rating over a second media category with a low average user rating. For example, control circuitry 304 may determine that sports-related media receives a higher average user rating than movies. In such situations, the update condition (e.g., 612) selected for sports-related media will trump the update condition (e.g., 612) selected for movies. Accordingly, control circuitry 304 will perform the update for the media asset (e.g., "Remember the Titans") because the update condition that is assigned to sports-related media is the "always update" condition 612.

Figure 7:
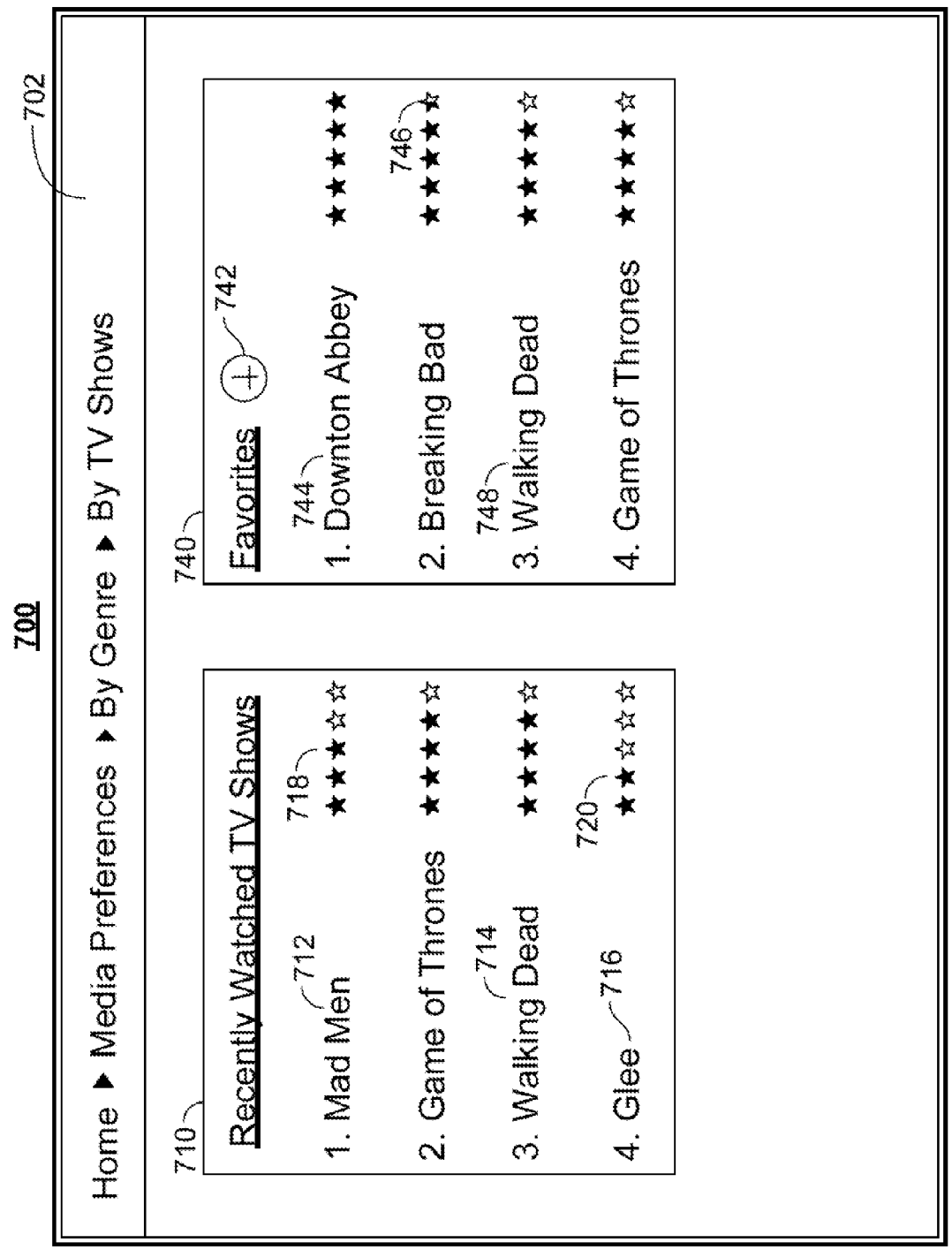
FIG. 7 is an illustrative screen for providing user ratings of media content in accordance with some embodiments of the disclosure.

FIG. 7 shows an illustrative screen 700 displayed on display 316 for receiving user ratings of media assets in accordance with some embodiments of the disclosure. These user ratings provide yet another metric for evaluating user preferences for various types of media and may be used by control circuitry 304 to dynamically determine when to perform updates.

As shown by title 702, screen 700 may not be displayed under the context of power consumption preferences, as is the case for FIG. 5 and FIG. 6. Title 702 may indicate that screen 700 is displayed under general viewing preferences. However, alternatively, screen 700 may be displayed under the context of power consumption preferences. In some embodiments, control circuitry 304 may receive user ratings from a user through user interface 314. In response to receiving the user ratings, control circuitry 304 may store the user ratings in storage 308 of user equipment device 300. In other embodiments, user ratings may be stored on storage 428 of remote server 424.

Control circuitry 304 may instruct display 316 to display region 710, which shows recently consumed media by a user of user equipment device 300. In the illustrative example shown in FIG. 7, the recently consumed media only includes TV shows. However, media assets of any media type and category may be listed. These may include, but are not limited to, recently watched movies, sports games, newscasts, and recently listened to music. Control circuitry 304 may receive a user rating for each media asset shown in region 710. Control circuitry 304 may detect and store the user rating by monitoring how many stars (or half-stars) are selected for each media asset. For example, a five-star rating corresponds to the highest and most favorable user rating and a one-star rating corresponds to the lowest and least favorable user rating. Control circuitry 304 may receive a user selection of a star rating through user input interface 314. Stars may be selected as whole stars or half stars 746. For example, control circuitry 304 receives a user input selection of three stars 718 for the recently watched media asset 712 (e.g., Mad Men), which is a TV series. Control circuitry 304 may rank media asset 712 (e.g., Mad Men) as the top-listed media asset in region 710, because control circuitry 304 determines that media asset 712 (e.g., Mad Men) is the most recently watched media asset on user equipment device 300. Third on the list is media asset 714 (e.g., Walking Dead). Control circuitry 304 receives a four-star user rating for media asset 714 (e.g., Walking Dead). In response to determining that media asset 714 (e.g., Walking Dead) may be one of the highest rated television series on user equipment device 300, control circuitry 304 may automatically add, without user input, media asset 714 (e.g., Walking Dead) to the user's list of favorite media assets, as shown by media asset 648 in region 740. Control circuitry 304 may store the user's list of favorite media assets in storage 308 and dynamically modify the list based the user's changing viewing history. In response to receiving user input to transition to screen 700 (e.g., by user selection 662 ("customize update" for TV shows) in FIG. 6), control circuitry 304 may fetch the most recently modified favorites list from storage 308 and instruct display 316 to display region 740 on screen 700.

Besides user ratings, control circuitry 304 may use other factors to determine which assets belong in the user's favorites list. In some embodiments, control circuitry 304 may monitor the consumption frequency of media assets and automatically add the most frequently consumed media assets to the favorites list 740. For example, control circuitry 304 may determine that media asset 744 (e.g., Downton Abbey) is the most frequently recorded and watched media asset on user equipment device 300. In response to this determination, control circuitry 304 may add media asset 744 (e.g., Downton Abbey) to the favorites list in storage. When control circuitry 304 receives user input to transition to screen 700, control circuitry 304 may fetch the list of favorite media assets from storage 308 and instructs display 316 to display media asset 744 (e.g., Downton Abbey 744), which is shown to the user for him/her to rate.

On the flip side, media assets that have low ratings or are not frequently consumed may not be automatically added by control circuitry 304 to the favorites list 740. For example, control circuitry 304 may receive a low user rating 720 of two stars for media asset 716 (e.g., television series Glee). In response to receiving the low user rating 720, control circuitry 304 may not add media asset 716 to the user's favorites list 740.

Control circuitry 304 may also determine which media assets belong to the user's favorites list based on user selection of favorite media assets. For example, control circuitry 304 may receive user selection of add option 742 through user input interface 314. In the illustrative example shown in FIG. 7, region 740 only includes TV series. However, media assets of any media type may be listed. User input interface 314 may receive a user request to add a favorite media asset through user selection of add option 742. In response to receiving the request through user input interface 314, control circuitry 304 may instruct display 316 to display a new window or screen (not shown) that provides the user with further options to select favorite media assets. Alternatively, user input interface 314 (e.g., keyboard) may receive a user's manual input of the name of a favorite media asset.

The user ratings that are inputted and stored through user interaction with screen 700 on user input interface 314 may be retrieved by control circuitry 304. Once retrieved, control circuitry 304 may dynamically determine when to perform a particular update to media information. This dynamic determination is particularly useful when a user has not selected an update condition for a particular type of media. Further details about this dynamic determination process are discussed in connection with FIGS. 8-10.

Figure 8:
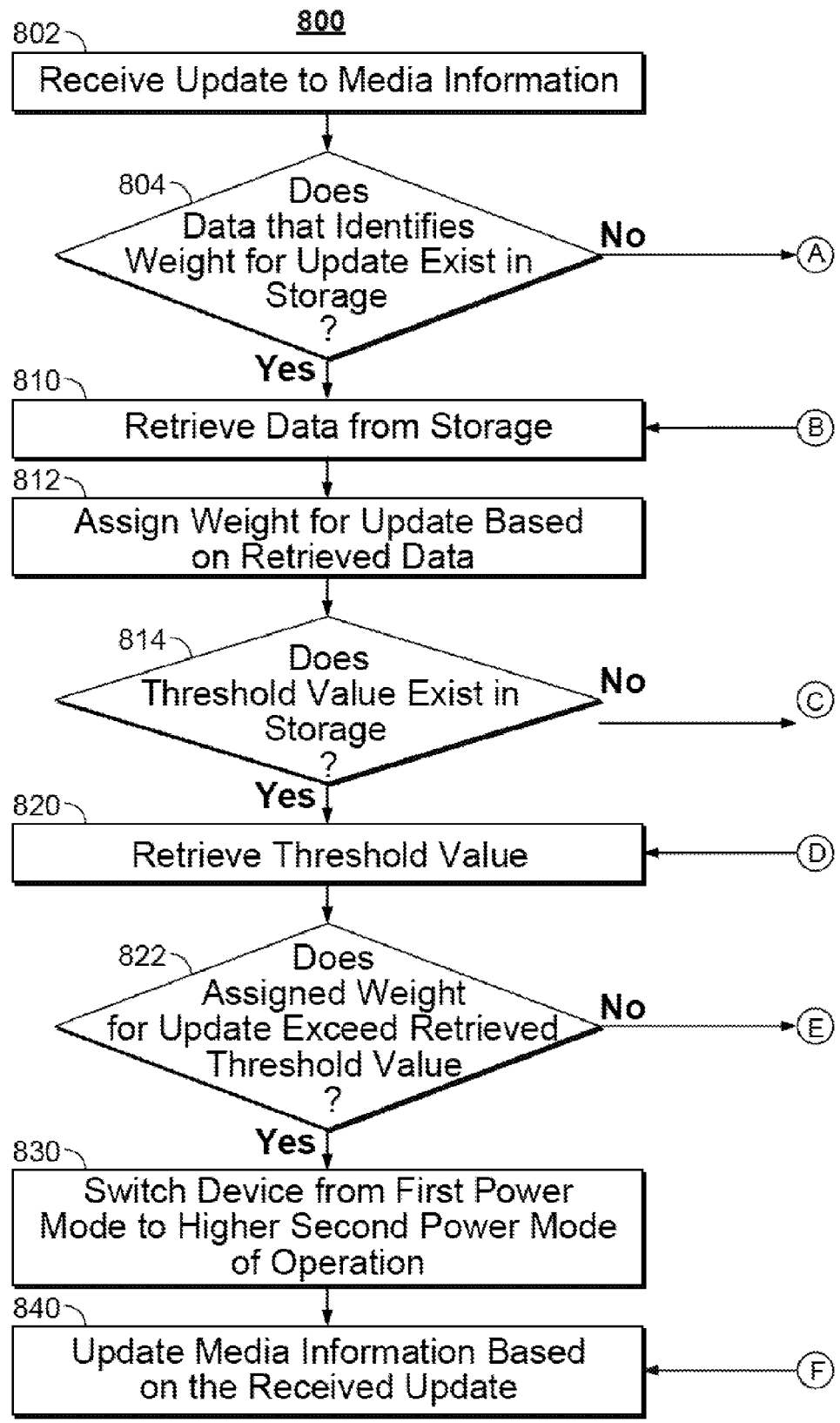
FIG. 8 is a flow-chart of the illustrative steps involved in switching a media equipment device to a second power mode in response to receiving an update to media information in accordance with some embodiments of the disclosure.
Figure 8:
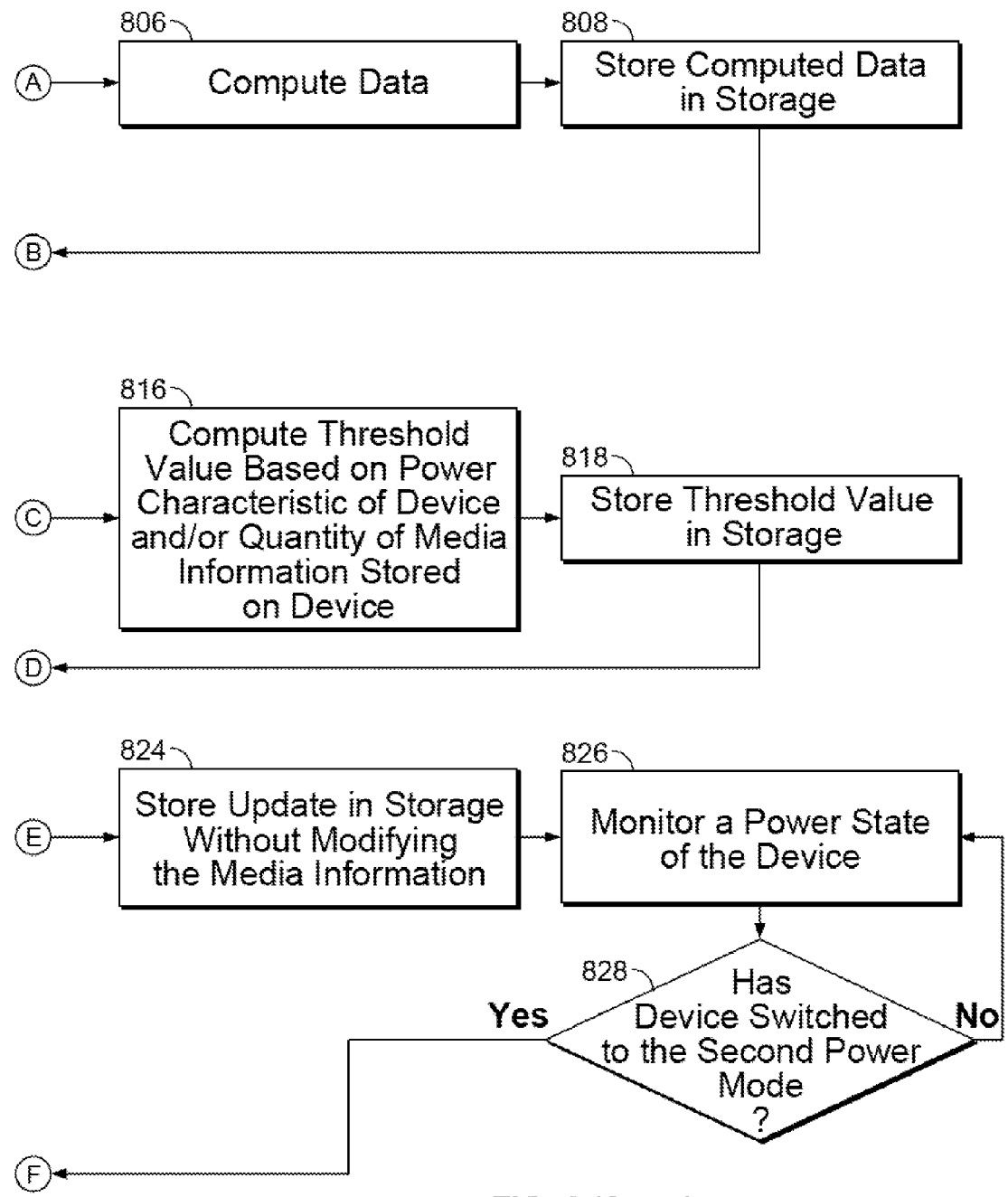

FIG. 8 is a flow-chart of the illustrative steps 800 involved in determining when to switch user equipment device 300 to a second power mode responsive to receiving an update to media information. The steps shown in FIG. 8 may be applicable in situations where a user of device 300 has not specified, via screen 600, update preferences for the media information to be updated. These steps are discussed in detail below.

In step 802, control circuitry 304 receives an update from media guidance data source 418 over communications network 414 to media information in storage 308. Next, in step 804, control circuitry 304 determines whether data that identifies a weight for the update exists in storage 308. Such data may include, but are not limited to, update preferences for types of media provided by the user via screen 600, user ratings for individual media assets provided by the user via screen 700, and viewing history information related to the media information computed by processing circuitry 306 of user equipment device 300 or processing circuitry 426 of remote server 424. In response to determining that such data already exists in storage 308, control circuitry 304 progresses to step 810 and retrieves the data from storage 308. In other cases, control circuitry 304 may determine that the data does not exist in storage 308. In response to such determination, control circuitry 304 may instruct processing circuitry 306 of user equipment device 300 to compute the data. More details about the computation of these data are discussed in relation to FIGS. 9A and 9B. After processing circuitry 306 computes the data in step 806, control circuitry 304 stores the computed data in storage 308 and retrieves the computed data in step 808.

After the data is retrieved in step 808, control circuitry 304 instructs processing circuitry 306 to assign a weight for the update based on the retrieved data. In some embodiments, the weight assigned to the update is a value retrieved from storage in step 808, wherein the retrieved data is a weight value associated with the media information to be updated. In other embodiments, the retrieved data is not a single value but rather a profile or model of a user's consuming habits or preferences. In such cases, processing circuitry 306 may compute a single numerical value for the profile, wherein the single value reflects the user's preference for consuming the media information to be updated. For example, processing circuitry 306 may determine the single value by computing the frequency of consumption (e.g., watching a program, listening to an audio recording) or total time duration (e.g., in hours) of consuming the media information to be updated over a fixed period of time (e.g., the last 2 weeks).

In another embodiment, processing circuitry 306 may compute the numerical value based on user ratings (e.g., number of stars as shown in FIG. 7, other numerical user rating schemes not shown) for various categories of media which characterize the media information to be updated. For example, processing circuitry 306 may compute the average or weighted average of user ratings for the various applicable media categories. More specifically, a given piece of media information to be updated may fall under both the movies and sports category (e.g., the football movie "Remember the Titans"). In some such cases, control circuitry 304 may fetch user ratings stored for each category (e.g., movies, sports) and instruct processing circuitry 306 to compute an average of those two ratings as the single value for the retrieved data.

In yet another embodiment, the retrieved data from step 810 may include both a profile of a user's consumption history and user preferences for various media content. In this example, the single values for each of the user profile and user preferences may be combined (e.g., weighted average, average, etc.) to compute a final desirability value of the media information to be updated.

In some cases, control circuitry 304 may directly assign the single value, as computed in various embodiments discussed above, as the update weight in step 812. In other cases, control circuitry 304 may normalize the single value by a normalization factor and then assign the normalized value as the update weight in step 812. Control circuitry 304 may store the update weight in storage 308. In some embodiments, control circuitry 304 may store a copy of the update weight in volatile storage 310 so that control circuitry 304 may easily fetch the update weight for comparison with the threshold value at a later step 822.

In step 814, control circuitry 304 may determine whether a threshold value exists in storage 308. In response to determining that the threshold value does exist in storage 308, control circuitry advances to step 820. Otherwise, processing circuitry 206 may compute the threshold value at step 816. In some embodiments, processing circuitry 306 may compute the threshold value based on properties of user equipment device 300. For example, these properties may include, but are not limited to, power consumption characteristics of device 300 and quantity of media information stored on device 300.

Power consumption characteristics may include, but are not limited to, battery usage information, screen brightness, screen saver settings, central processing unit (CPU) power usage, graphic processing unit (GPU) power usage, integrated processor power usage, number of applications currently running on user equipment device 300, number and frequency of recordings scheduled to be performed on user equipment device 300, and the current power mode of operation (e.g., active mode, sleep mode). The level of power consumption for each or some of these power characteristics are monitored by PMU 320. Control circuitry 304 may communicate with PMU 320 to obtain a power consumption profile for user equipment device 300, wherein the profile contains the current level of power consumption corresponding to each of some of all of the power characteristics monitored by PMU 320. Control circuitry 304 may instruct processing circuitry 306 to compute a threshold value based on the power consumption profile. For example, processing circuitry 306 may compute an average or sum of the power consumption levels of each of the power characteristics in the power profile. The average may be a weighted average, wherein the power consumption levels of the different power characteristics are weighted differently. In some cases, control circuitry 304 may assign this average or sum as the threshold value in step 816. In other cases, control circuitry 304 may normalize the average or sum by a normalization factor and assign the normalized value as the threshold value in step 816.

For example, each power characteristic may correspond to a single watt value. These watt values are summed by processing circuitry 306 across all power characteristics in the power profile generated by PMU 320. Processing circuitry 306 may normalize the sum by a normalization factor and assign the normalized sum as the threshold value. The normalization factor may be required so that the weight value assigned to the update in step 812 may be appropriately compared to the threshold value.

Control circuitry 306 may also use the quantity of media information stored in storage 308 to determine the threshold value at step 816. In some embodiments, control circuitry 304 may instruct processing circuitry 306 to measure the quantity of media information by determining how much storage space in storage 308 is occupied by the media information to be updated. Alternatively, processing circuitry 306 may measure the amount of storage space occupied by all media information in storage 308, not just the information to be updated. In other embodiments, control circuitry 304 may instruct processing circuitry 306 to measure the quantity of media information as a function of how long the media information is applicable. For example, media information may be program schedule information for the ABC channel that is only pertinent for the next two weeks. In another example, the program schedule information for the ABC channel may only be pertinent for the next 2 days. In such cases, processing circuitry 306 may compute a higher threshold value for media information applicable for 2 weeks than for media information only applicable for 2 days. Accordingly, updates for such media information (e.g., program schedule information for the ABC channel) will more likely be performed by control circuitry 304 if the relevant media information stored in 308 will expire earlier.

After processing circuitry 306 computes the threshold value at step 816, control circuitry 304 stores the computed threshold value in storage 308 at step 818. In some embodiments, control circuitry 304 stores a copy of the threshold value in volatile storage 310 so that control circuitry 304 may quickly fetch the value in subsequent step 822. Control circuitry 304 then advances to step 820 and retrieves the threshold value from storage 308.

At step 822, control circuitry 304 fetches both the assigned update weight computed in step 812 and the threshold value from storage 308 and determines whether the update weight exceeds the threshold value. In response to determining that the update weight exceeds the threshold value, control circuitry 304 may instruct PMU 320 to switch device 300 to a second power mode of operation (e.g., active mode, awake mode, update mode, full-power mode) so that the update to media information can be subsequently performed by control circuitry 304 in step 840 based on the received update in 802. In some cases, control circuitry 304 may perform the update in step 840 by replacing or supplementing old media information stored in storage 308 with new media information contained in the received update. In some cases, the update received in step 802 by control circuitry 304 may contain multiple updates to different media information. In such cases, control circuitry 304 may perform one or more of the updates. In some such cases, control circuitry 304 may perform all of the updates in step 840. The update process in step 840 may further involve a modification process, whereby control circuitry 304 may modify or add a data field to the media information indicating the time at which the update was performed. Control circuitry 304 may also modify the data field to indicate a next time at which an update should be performed for that media information. Such information contained in the data field may be useful in constructing an update schedule that is more conducive to energy conservation.

In response to determining that the update weight does not exceed the threshold value at step 822, control circuitry 304 may postpone the update and instead store the received update in storage 308 at step 824 without modifying the media information subject to the update. In some embodiments, control circuitry 304 may store the update information in volatile storage, so that it can be quickly fetched by control circuitry 304 when user equipment device 300 has switched to a second power mode (e.g., active mode, awake mode, full-power mode) at step 828. In other embodiments, control circuitry 304 may store the update information in nonvolatile storage so that the update information will not be lost in case device 300 loses power before the update is performed. At step 826, PMU 320 takes over and monitors the power state of device 300. PMU 320 continuously checks if device 300 has switched to a second power mode of operation 828. If the switch has not occurred, then PMU 320 continues the monitoring process in step 826. If PMU 320 detects that device 320 has switched to a second power mode of operation (e.g., active mode, full-power mode, update mode) in step 828, PMU 320 will instruct control circuitry 304 to perform the update in step 840 by fetching the previously stored update from storage 308 and performing the update on media information subject to the update.

Figure 9A:
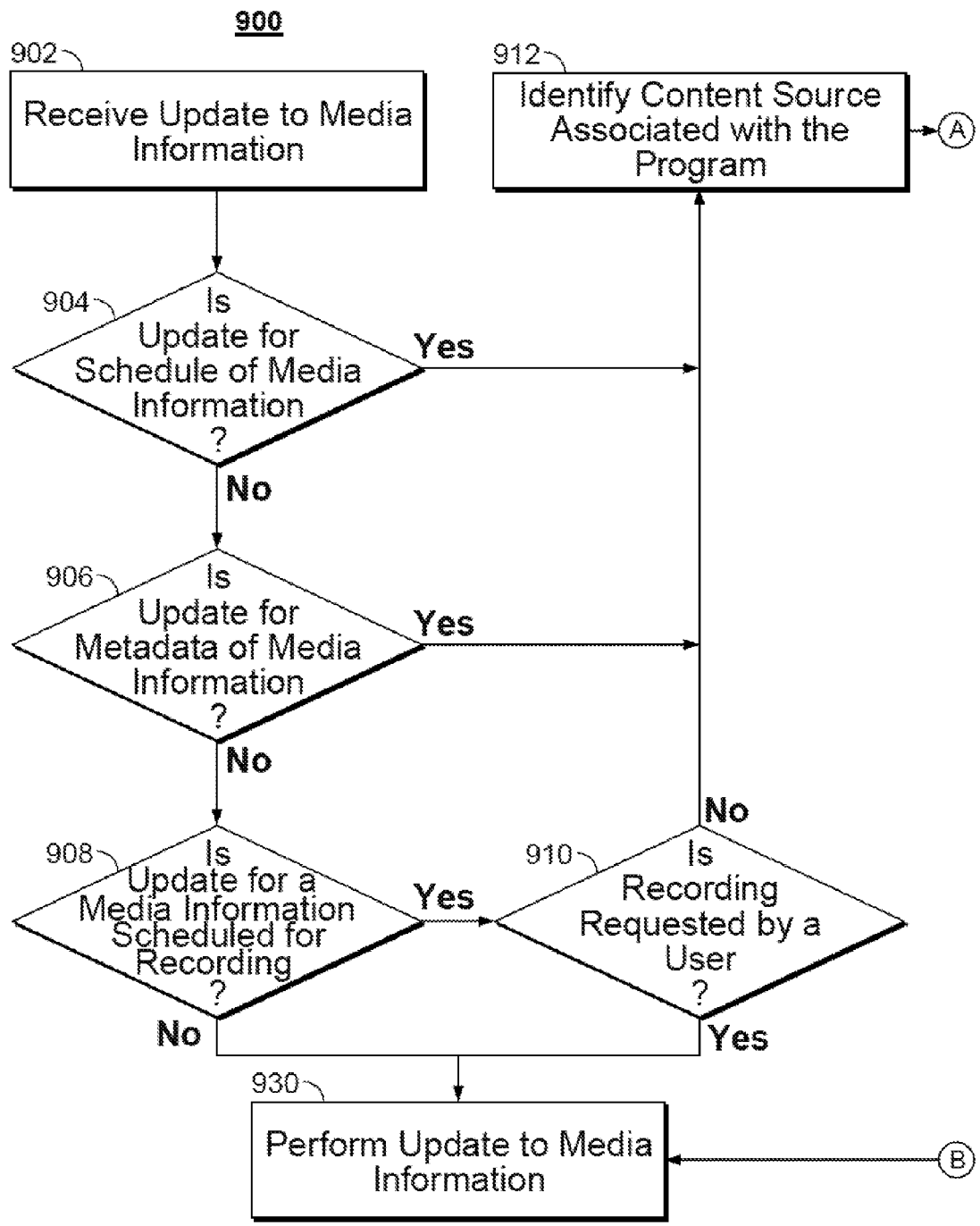
FIG. 9A is a flow-chart of the illustrative steps involved determining when to perform an update by computing the weight of a content source associated with the media information to be updated in accordance with some embodiments of the disclosure.
Figure 9A:
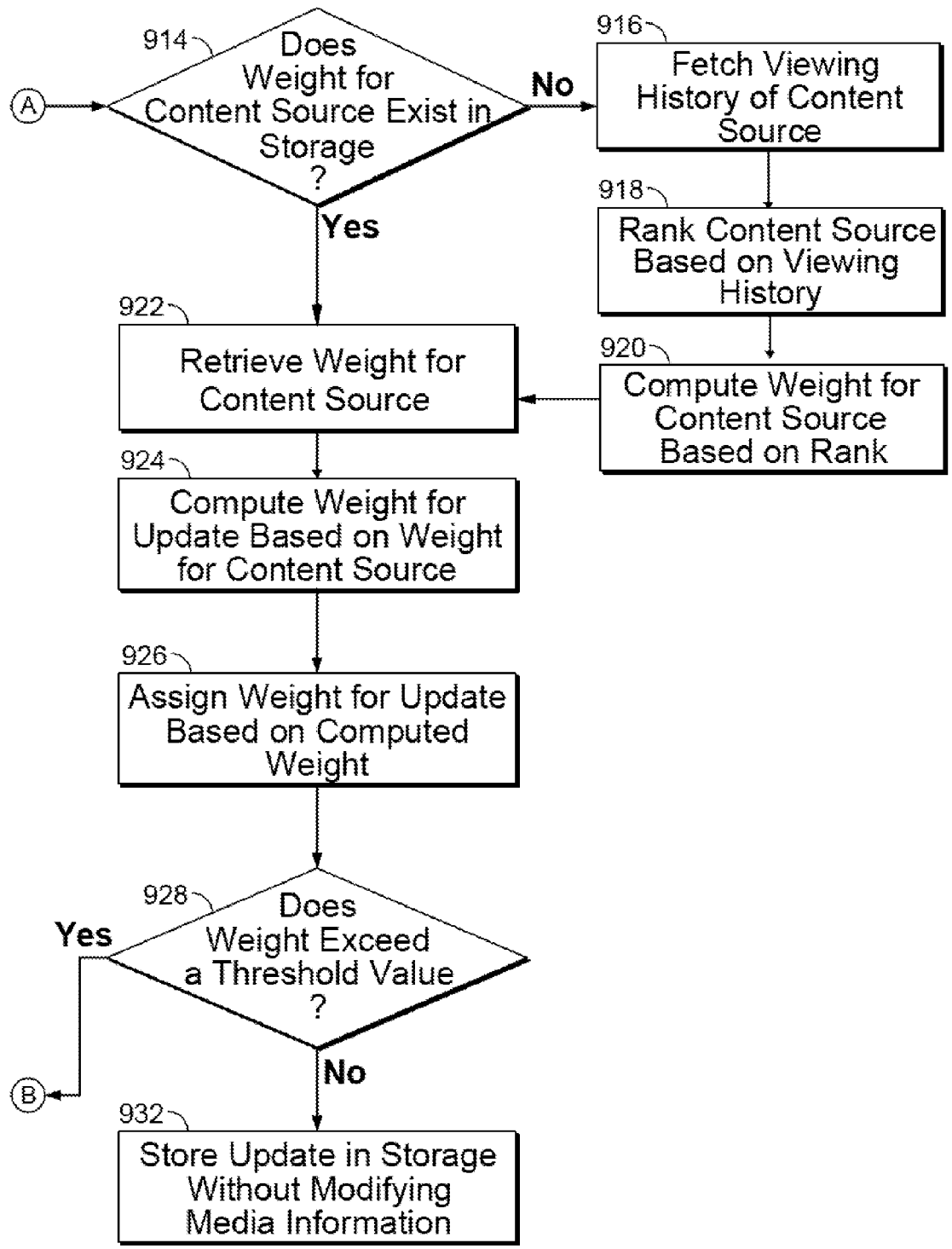
Figure 9B:
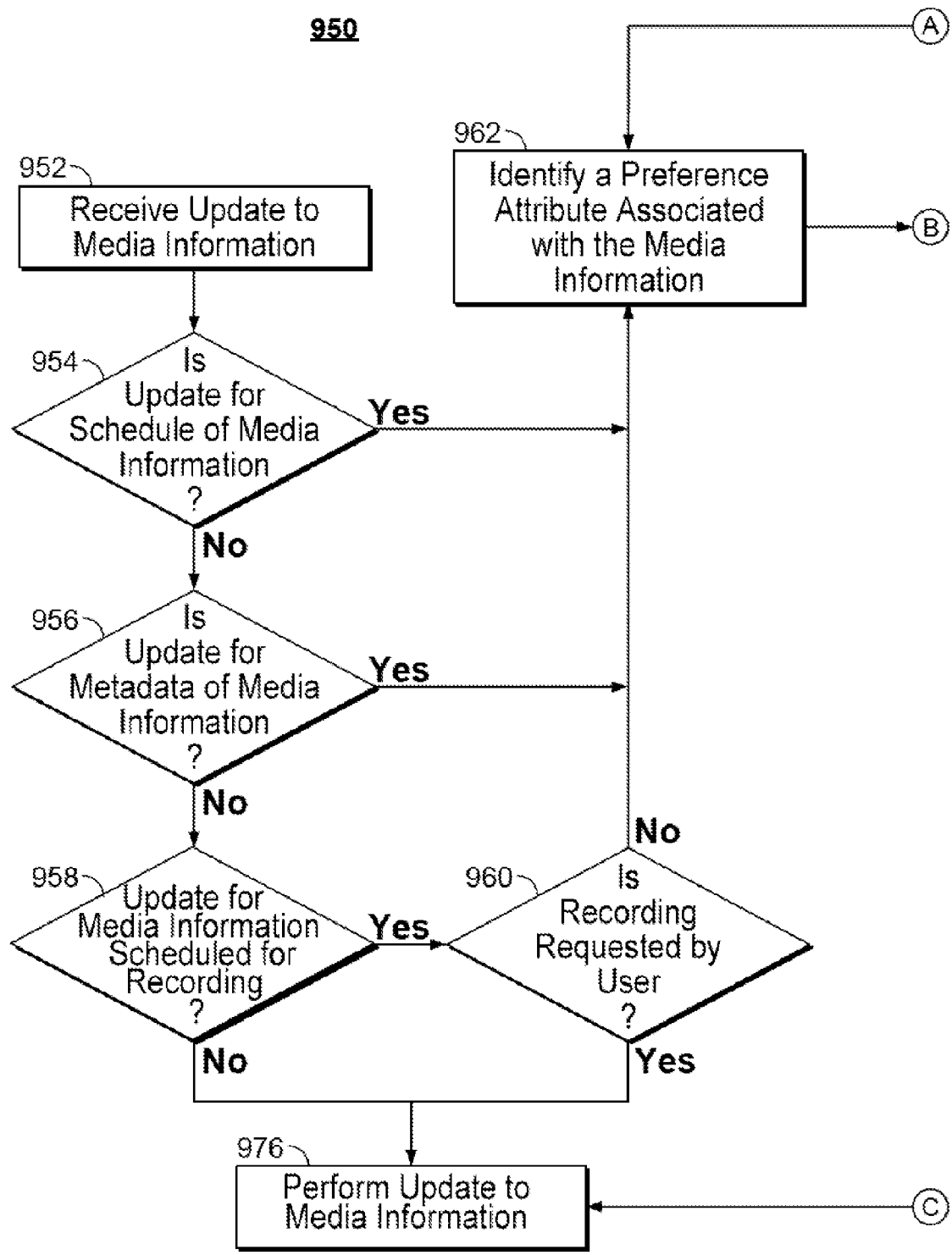
FIG. 9B is a flow-chart of the illustrative steps involved in determining when to perform an update by computing the weight of the update based on preference levels assigned to various preference attributes associated with the media information to be updated in accordance with some embodiments of the disclosure.
Figure 9B:
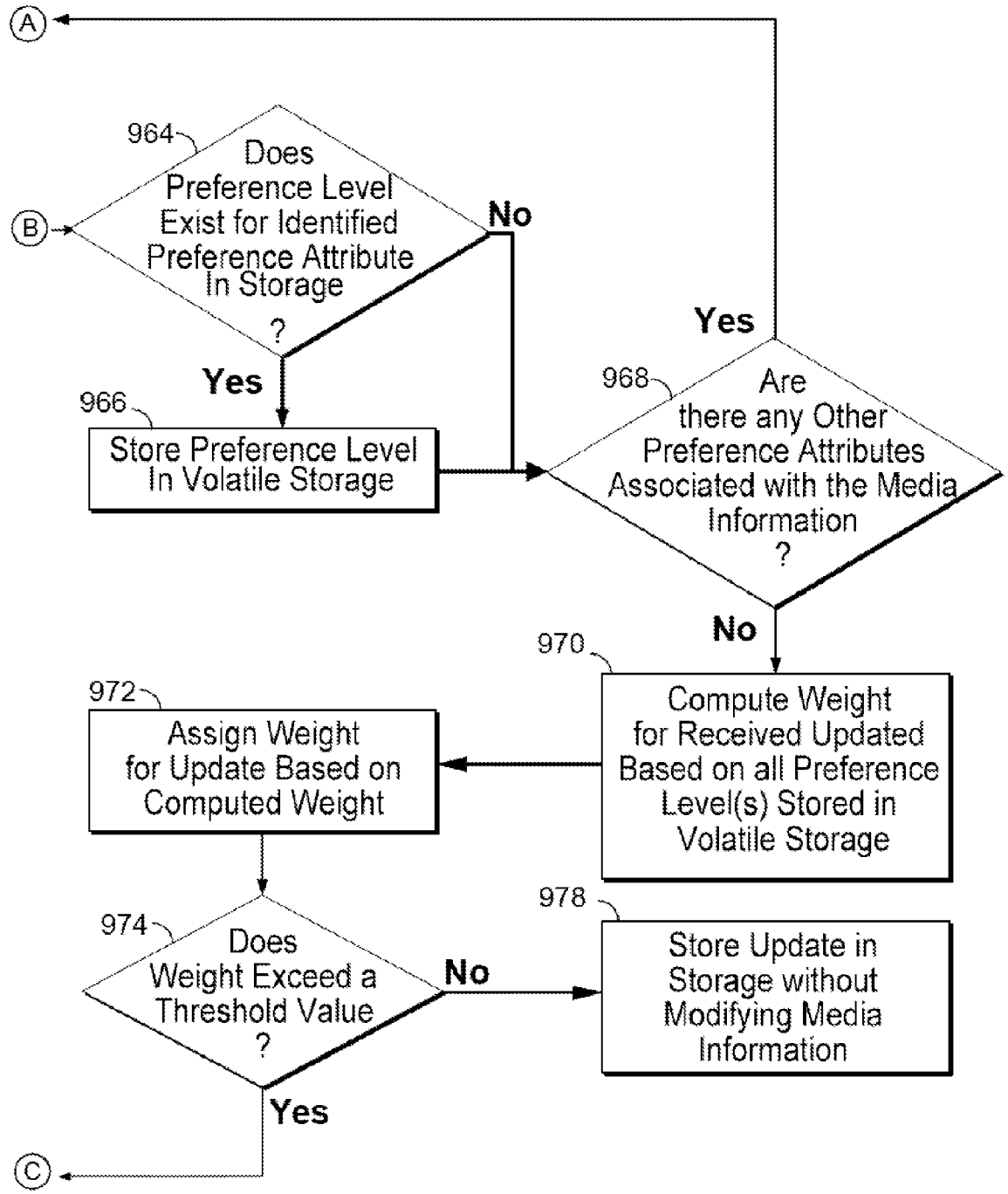

FIGS. 9A and 9B show illustrative steps for determining when to perform an update by computing the update weight in different ways based on the type of update received.

FIG. 9A shows illustrative steps 900 for assigning the update weight by computing a weight for a content source associated with the media information to be updated.

As in FIG. 8, FIG. 9A begins with control circuitry 304 receiving an update to media information in step 902. Next, control circuitry 304 determines the type of update received by checking conditions exemplified in step 904, 906, and 908, respectively, as shown in FIG. 9A. In embodiments different from the embodiment shown in FIG. 9A, the three steps may be checked in any order. In step 904, control circuitry 304 determines whether the update is for schedule of media information. For example, the update may be for updating program schedule information from a particular content source. Schedule information may include the times during the week and day at which a particular media asset from the content source is broadcast or made available to user of media equipment device 300. In response to determining that the update is determined to be for schedule information at step 904, control circuitry 304 may identify the content source associated with the media information at step 912. For example, control circuitry 304 may identify the content source to be a particular TV channel (e.g., ABC, ESPN, NBC, HBO, etc.) or Internet content provider (e.g., Hulu, Netflix, Amazon). In general, content sources may include, but are not limited to, TV channel, internet content providers, cable providers, video-on-demand providers, pay-per-view providers, and music sources. Once the content source is identified, control circuitry advances to step 914.

In some embodiments (not explicitly shown in FIG. 9A), control circuitry 304 may determine whether or not to perform the update based on the type of content source identified in step 912. For example, in response to determining that the content source is an internet content provider (e.g., Hulu, Netflix, Amazon), control circuitry 304 may directly advance to step 930 to perform the update. In another example, in response to determining that the content source is instead from a cable source (e.g., Comcast, Verizon), control circuitry 304 may only sometimes perform the update by continuing through the flow-chart as shown in FIG. 9A.

If control circuitry 304 determines that the update is not for schedule of media information in step 904, control circuitry 304 may move to step 806 and determine whether the update is for metadata of media information. Metadata may include, but are not limited to, artist information, copyright information, summary information, cast information, production information, director information, biographical details, price information, format information, image quality information, audio quality information, language information, author information, date information (e.g., create date, expiration date), accessibility information, parental control information, ratings information, disclaimer information, etc. In response to determining that the update is for metadata of media information, control circuitry 912 may advance to step 912 and then 914.

If, however, control circuitry determines that the update is not for metadata information in step 906, control circuitry 304 may advance to step 908, where control circuitry 304 may determine whether the update is for media information that has already been scheduled for recording. Control circuitry 304 may make this determination by first identifying one or more media assets to be updated in the update received in step 902. Control circuitry 304 may then fetch a list of media assets that have been scheduled for recording from storage 308. In some cases, the recording of a media asset may have been scheduled manually by user input. In other cases, the recording of a media asset may have been automatically scheduled, without user input, by user equipment device 300 or remote server 424. Control circuitry 304 determines whether the received update is an update for media information that has already been scheduled for recording in step 908 if any of the identified media assets matches a media asset that is in the list of scheduled recordings.

In response to determining that the update is for media information already scheduled for recording, control circuitry 304 may determine in step 910 whether the recording was requested by a user. In response to determining that the recording was requested by a user, control circuitry 304 may perform the update to media information at step 930 as part of or in addition to performing the scheduled recording. Otherwise, in response to determining that the recording was not requested by a user (e.g., automatically scheduled by device 300 or remote server 424), control circuitry 304 may postpone the update and recording for the media information and advance to step 912 and then 914.

In response to determining that the update does not satisfy the update types specified in steps 904, 906, and 908, control circuitry 304 may advance from step 908 to step 930 and performs the update to media information at step 930. This is because the update may be a system update necessary for ordinary functionality of user equipment device 300. The update may also be a software update for applications installed on user equipment device 300. Software updates may be postponed in embodiments different from the embodiment shown in FIG. 9A.

At step 914, control circuitry 304 checks whether a weight associated with the identified content source exists in storage 308. In some embodiments, the weight may be stored in storage 308 of user equipment device 300. In other embodiments, the weight may be stored in storage 428 of remote server 424. In these other embodiments, the weight may be stored in a database residing in storage 428, wherein a plurality of content sources are each associated with a different weight value. To determine that the weight exists on remote server 424, control circuitry 304 may send a request for the weight to remote server 424 over communications network 414. In response to receiving from remote server 424 an indication that the weight does not exist (e.g., null value, negative return value), control circuitry 304 advances to step 916 to compute a weight for the content source by fetching a viewing history of the content source. Otherwise, in response to determining that the weight does exist in either local storage 308 or remote storage 428, control circuitry 304 retrieves the weight from storage in step 922. Subsequently, control circuitry 304 advances to step 924.

In step 916, control circuitry 304 fetches a viewing history for the content source identified in step 912. The viewing history may be stored in a database or table. In some embodiments, control circuitry 304 fetches the viewing history from local storage 308. In other embodiments, control circuitry 304 fetches the viewing history from remote storage 424. In either case, the viewing history may have been computed by processing circuitry (e.g., 306 or 426) prior to the fetching at step 916. Further details about the computation of the viewing history are discussed below.

Control circuitry 304 may continuously monitor the viewing history of each of the content sources which transmit media information to user equipment device 300. Control circuitry 304 may store the viewing history in storage 308 as a table in a database, wherein each table may correspond to the viewing history of a particular content source. Each entry in the table may contain one or more of the following fields: a particular content source, a viewing time, a viewing duration, a viewed media asset, metadata associated with the media asset, user id, user rating and/or other preferences corresponding to the viewed media asset, and one or more media categories and/or media types associated with the viewed media asset. Control circuitry 304 may instruct processing circuitry 306 to generate a viewing history profile for each table (which corresponds to a content source) based on the entries in the table. The viewing history profile may contain various metrics, as computed by processing circuitry 306, that reflect the viewing behavior of the user. For example, these metrics may include, but are not limited to: viewing frequency, viewing duration, average viewing duration, standard deviation of viewing duration, variance of viewing duration, peak times for viewing, distribution of viewing times, etc. Once the viewing history profiles for each content source are computed by processing circuitry 306, they are stored in storage 308 by control circuitry 304. Control circuitry 304 may periodically instruct processing circuitry 306 to re-compute or update the viewing history profile (e.g., every day, weekly, bi-weekly, mi-monthly, monthly) so that the viewing history contains up-to-date, and thus relevant, information.

In some embodiments, the viewing history may be computed for one or a combination of the following: media assets (e.g., a TV series, a season of a TV series, an album of music), categories of media assets (e.g., TV shows, movies, news), and types of media formats (e.g., video-on-demand, broadcast TV, audio) that are provided by the identified content source (e.g., in step 912) to user equipment device 300.

In other embodiments, control circuitry 304 may fetch at step 916 a viewing history of the identified content source which represents an aggregate of viewing histories across a plurality of user equipment devices. In these instances, control circuitry 304 may instruct remote server 424 to fetch viewing histories from each of a plurality of user equipment devices 402, 404, and/or 406. Remote server 424 may instruct processing circuitry 426 to compute an aggregate viewing history based combining the individual viewing histories fetched from each of the plurality of user equipment devices. Processing circuitry 426 may re-compute some of all of the viewing metrics contained in a viewing history profile that were computed for an individual user equipment device 300 so that the metrics in the aggregate viewing history reflect aggregate viewing history of a plurality of user equipment devices, instead of one particular user equipment device 300. For example, processing circuitry 426 may generate a new distribution model correlating average viewing frequency or average viewing time to different users. Furthermore, processing circuitry may further pivot the viewing history based on viewer demographics or types of media information provided by the content source.

Based on the viewing history fetched in step 916, processing circuitry 306 (or 426) ranks the identified content source in step 918. Control circuitry 304 fetches the viewing histories for each content source available to media equipment device 300 from either local storage 308 or remote storage 428. In other embodiments, the viewing histories are scattered across multiple devices, requiring control circuitry 304 to communicate with those remote devices to fetch the viewing histories. Once the viewing histories of multiple content sources are obtained, control circuitry may instruct processing circuitry 306 to rank the identified content source based by comparing it to the viewing histories of other content sources. The ranking may be determined by processing circuitry 306 by comparing one or a combination of viewing characteristics (e.g., viewing frequency, viewing duration, number of viewers during prime time hours, total number of viewers, etc.) associated with the viewing history of the identified content source with one or a combination of viewing characteristics of the viewing histories of other content sources. Different characteristics may be weighted differently. For example, the viewing frequency may be weighted more than the total number of viewers for a content source. Based on the values of these different viewing characteristics for each content source, processing circuitry 306 may compute a relative ranking for the content source. In other embodiments, the rank of the content source is stored with the viewing history and may be retrieved by control circuitry 304 when fetched in step 916.

Processing circuitry 306 then computes a weight for the identified content source in step 920 based on the relative ranking computed in 918. Processing circuitry 306 may compute the weight for the content source by normalizing the ranking by a normalization factor. Alternatively, processing circuitry 306 may assign the ranking of the content source as the weight of the content source itself. Once the weight is computed by processing circuitry 306, control circuitry 304 stores the weight in storage 308 or 428, depending on the embodiment, and the stored weight is subsequently retrieved by control circuitry 304 in step 922.

Once the weight for the content source is retrieved, processing circuitry 306 computes the weight for the update in step 824. Subsequent steps 824 through 830 are performed similarly to steps 712 through 740, as discussed in FIG. 7.

FIG. 9B shows illustrative steps 950 for assigning the update weight in a different way. Instead of computing a weight for a content source associated with the media information to be updated, as shown in FIG. 9A, FIG. 9B shows steps that assign the update weight based on preference attributes associated with the media information to be updated. FIG. 9B begins in the same way as FIG. 9A. Steps 952 through 960 correspond to steps 902 through 910, respectively. At step 962, instead of identifying a content source associated with the media information to be updated, control circuitry 304 identifies preference attributes associated with the media information. These preference attributes may have been set via options shown in screen 500, 600, or 700 by a user of user equipment device 300 through user input interface 314 and subsequently stored in local storage 308 or remote storage 428. These preference attributes may include, but are not limited to, an update preference for the media information (e.g., always update 612, only update when device 300 is active 612, customize update condition 616 based on the actual media asset to be updated, dynamic update based on a user's media preferences and current power state of device 300), the types of media information included in the update received in step 952 (e.g., genre, media format type, content source, as shown in FIG. 5), the genre of media information (e.g., news, sports, movies, TV shows, music, etc., as shown in FIG. 6), media format type (e.g., video-on-demand, pay-per-view, broadcast television, audio, etc.), and content source (e.g., TV channel such as ABC, music source such as Pandora, internet content provider source such as Hulu, pay-per-view provider, video-on-demand provider).

Once a preference attribute is identified in step 962, control circuitry 304 determines whether there exists a preference level in local storage 308 or remote storage 428 for the identified preference attribute. If the preference level exists at step 964, control circuitry 304 stores it in temporary volatile storage 310 at step 966 so that it may be fetched more easily later on when an aggregate weight is computed based on all identified preference attributes in step 970. Once the preference level is stored in step 966, control circuitry 304 checks if any other preference attributes are associated with the media information to be updated in step 968. In response to determining that more preference attributes exist in the media information, control circuitry 304 will go back to step 962 and continue to identify preference attributes.

In an event a user expresses preference for one of the three update conditions 612, 614, and 616 displayed in screen 600 in FIG. 6 via user input interface 314, control circuitry 304 may assign a very low preference value (e.g., zero) or a very high preference value (e.g., some maximum constant value) to the update preference attribute and store the preference value in volatile storage 310 at step 966. For example, if control circuitry received user selection of update condition 612 ("always update") through user input interface 314, control circuitry 304 may assign a maximum constant value as the update preference attribute such that any subsequent update weight that may be computed by processing circuitry 306 in subsequent steps of FIG. 9B may be higher than the threshold value, as determined in step 974. This way, control circuitry 304 may always perform an update at step 976 for media information that falls under a media category that is subject to the "always update" condition 612. In another example, if control circuitry 304 receives user selection of update condition 614 ("only update when device is active"), control circuitry 304 may assign a zero value to the update preference attribute such that any subsequent update weight that may be computed by processing circuitry 306 in subsequent steps of FIG. 9B may be lower than the threshold value, as determined in step 974. This way, if the device is operating at a first power mode (e.g., sleep mode, standby mode, power-off mode), control circuitry 304 may always postpone an update at step 978 to media information that fall under a media category subject to update condition 614 ("only update when device is active").

In some cases, control circuitry 304 may determine that the preference level for the identified preference attribute does not exist in storage at step 964. In response to such determination, control circuitry 304 may check to see whether any other preference attributes exist in the media information at step 968 and if so, return to step 962 to repeat the process of identifying preference attributes in the media information.

In response to determining that a preference level does not exist in storage for an identified preference attribute at step 964, control circuitry 304, in embodiments different from the embodiment shown in FIG. 9B, may instruct processing circuitry 306 or remote processing circuitry 426 over communication network 414 to compute a preference level for the preference attribute. In some cases, preference levels may be numerical values which correspond to user ratings inputted by the user via screen 700. In other cases, preference levels may be a single viewing desirability metric computed by processing circuitry 306 based on viewing history profiles fetched from storage 308 or 428. These viewing histories may be the ones determined in step 916 of FIG. 9A, wherein the viewing history for the content source associated with the media information to be updated comprises various viewing metrics which may be combined and processed by processing circuitry 306 or 426 to output a single value. Processing circuitry 306 may also compute a viewing history for other media categories besides content source. These media categories may be associated with the preference attributes identified in step 962. For example, control circuitry 304 may determine that the received update is for media information falling under the genre category of sports. At step 962, control circuitry 304 may identify a preference attribute to be the user's preference for the sports genre. In response to determining that a preference level does not already exist in storage 308 or 428 for the sports genre at step 964, control circuitry 304 may retrieve from storage 308 or 428 a viewing history for all sports-related media information viewed on user equipment device 300. Control circuitry 304 may then instruct processing circuitry 306 to automatically compute the user's preference level for the sports genre based on viewing characteristics extracted from the retrieved viewing history for sports-related media information. The retrieved viewing histories may be computed by processing circuitry 306 prior to their retrieval by control circuitry 304, as described during discussion of steps 916-920 in connection with FIG. 9A. After processing circuitry 306 computes the preference level, control circuitry 304 stores the preference level for the associated preference attribute at step 966. Control circuitry 304 then advances to step 968, where it checks whether there exist any other preference attributes in the media information to be updated.

The process of identifying preference attributes in the media information and storing the corresponding preference level in nonvolatile storage 312 continues in a loop until no more preference attributes may be identified, as determined by step 968. In this case, control circuitry 304 advances to step 970 and instructs processing circuitry 306 or remote processing circuitry 426 over communications network 414 to compute a weight at step 970 for the update based on all preference levels stored in volatile storage at step 966 for their respective identified preference attributes. In some instances, processing circuitry 306 or 426 may compute an average of those stored preference levels to be the weight. In other instances, processing circuitry 306 or 426 may compute a weighted average of those preference levels to be the weight for the update, wherein each preference attribute is weighted differently.

At step 972 processing circuitry 306 or 426 assigns a weight for the update based on the weight computed for the update in step 970. In some instances, the assigned weight may be the computed weight in step 970. In other instances, processing circuitry normalizes the computed weight by a factor and assigns the normalized weight as the weight for the update. The normalization may be used so that the update weight may be appropriately compared to the threshold value in subsequent step 974.

Steps 974, 976, and 978 are similarly performed as Steps 929, 930, and 932, respectively, shown in FIG. 9A.

Figure 10:
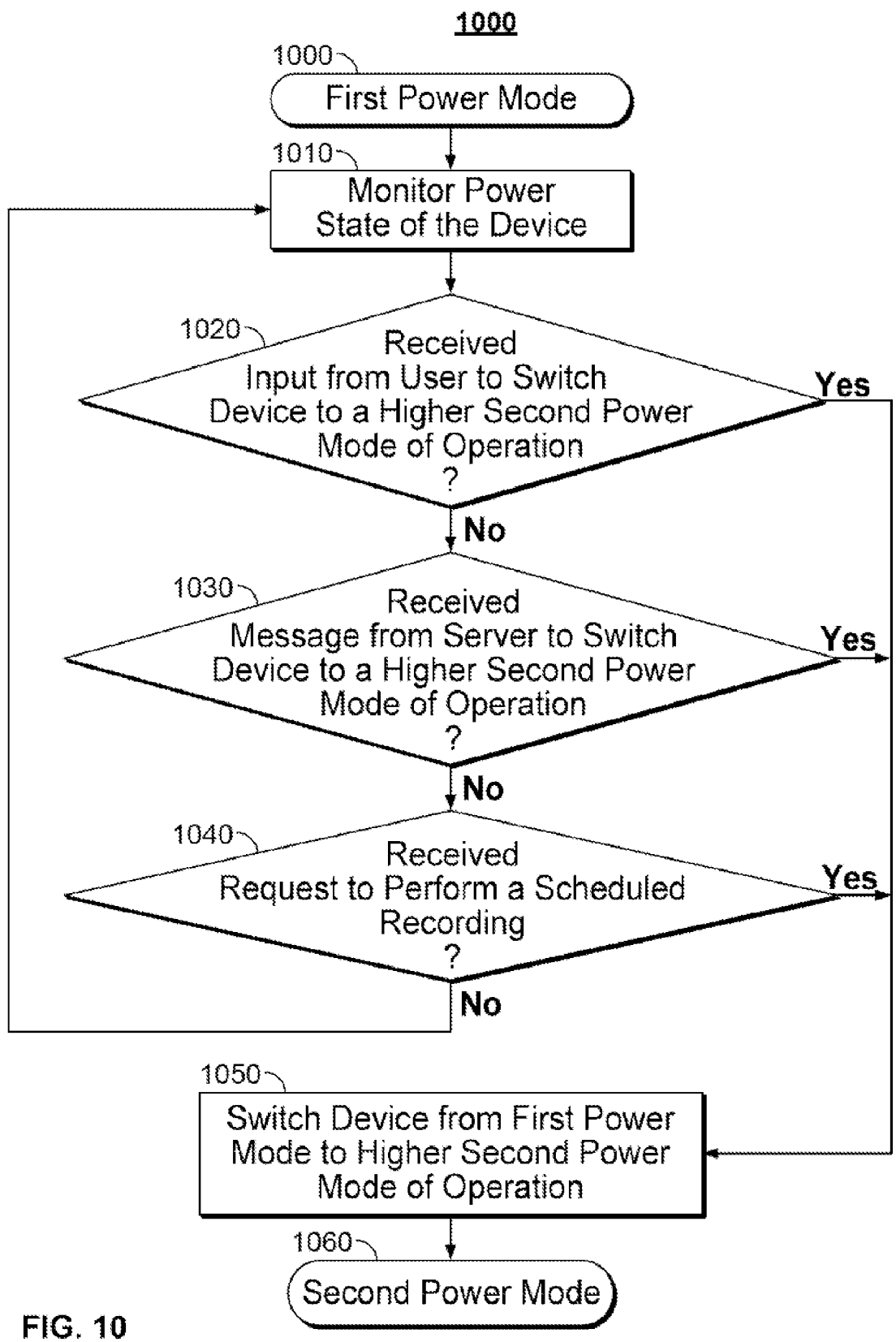
FIG. 10 is a flow-chart of the illustrative steps involved in determining when to switch a media equipment device to a second power mode of during the monitoring process of the device's power state in accordance with some embodiments of the disclosure.

FIG. 10 provides further details about the monitoring process of the power state of user equipment device 300, as briefly discussed in steps 826 and 828 of FIG. 8.

The monitoring process begins with media equipment device 300 operating at a first power mode 1000. First power mode 1000 is a mode at which device 300 operates at a low level of power consumption. Such low power modes include a standby mode, a sleep mode, and a power-off mode. PMU 320 begins performing the monitoring process at step 1010 by monitoring the power mode of device 300. Power modes are discrete modes of operation of device 300 and may be switched by PMU 320 from one to the other at any time in response to various conditions. Certain conditions may cause PMU 320 to switch media equipment device 300 to a second power mode of operation (e.g., active mode, awake mode, update mode, full-power mode). These conditions are exemplified by steps 1020, 1030, and 1040 in FIG. 10. If at any point during the monitoring process, one of these conditions is satisfied, PMU will switch the device from the first power mode to a higher second power mode 1060 by advancing to step 1050. The second power mode is a high mode of operation which allows device 300 to perform updates to media information, as discussed in FIGS. 8-9. Second power modes include, but are not limited to, an active mode, an awake mode, a full-power mode, and an update mode which allows device 300 to perform updates to media information.

PMU 320 may determine whether any of the switching conditions are met by checking each condition in a sequential manner. In embodiments different from the one shown in FIG. 10, PMU 320 may check the conditions 1020, 1030, and 1040 in any other order, partially in parallel, or all in parallel. First, PMU 320 checks whether user input has been received by control circuitry 304 to switch the device to a second power mode. For example, control circuitry 304 may receive user input to switch to a second power mode when a user manually turns on the device (e.g. from a power-off mode to a power-on mode). In response to receiving the user input, control circuitry 304 may instruct PMU 320 to advance to step 1050. Otherwise, PMU checks the second condition in step 1030.

At step 1020, PMU 320 checks whether control circuitry 304 of device 300 has received a message from remote server 424 indicating that device 300 should be switched to a second power mode. In some instances, the message may contain instructions to switch device 300 to a second power mode. In other instances, the message may contain a notification of when the next update will be sent. For example, the notification may indicate that a cluster of updates will be sent to device 300 at 4:00 AM. In this case, control circuitry 304 instructs PMU 320 to switch device 300 to a second power mode in order to perform the cluster of updates that will be sent starting at 4:00 AM. In response to determining that the message from the server has been received, control circuitry 304 instructs PMU 320 to advance to step 1050. Otherwise, PMU 320 checks the third condition in step 1040.

The third condition is met if device 300 receives a request to perform a scheduled recording. In response to determining that a request to perform a schedule recording has been received, control circuitry 304 may instruct PMU 320 to step 1050. If not, PMU may loop through the monitoring process again by returning to step 1010.

In embodiments different from the embodiment illustrated in FIG. 10, PMU 320 may communicate with control circuitry 304 to check at step 1040 whether the recording was requested by a user of media equipment device 300 or automatically scheduled by control circuitry 304 of device 300. If control circuitry 304 determines that the request was made by a user, PMU 320 may advance to step 1050. If, on the other hand, control circuitry 304 determines that the recording was automatically scheduled by device 300, PMU may not advance to step 1050 and instead repeat the monitoring process by returning to step 1010.

The above-described embodiments of the present disclosure are presented for purposes of illustration and not of limitation, and the present disclosure is limited only by the claims which follow.

What is claimed is:

1. A method for operating a media equipment device, the method comprising:
receiving an update to media information stored on the media equipment device, wherein the media information is associated with a content source;
determining a viewing history of each content source from a plurality of content sources available to the media equipment device;

ranking each content source from the plurality of content sources based on the respective determined viewing history;

computing a weight for each content source from the plurality of content sources based on the respective ranking;

retrieving data from a storage device that identifies a first weight for the update;

assigning a second weight for the update based on the retrieved data and on the computed weight of the content source associated with the media information that is subject to the update;

retrieving from the storage device a threshold value;

determining whether the second weight exceeds the retrieved threshold value;

in response to determining that the second weight exceeds the threshold value, switching the media equipment device from a first power mode of operation to a second power mode of operation, wherein the media equipment device consumes more power when operating in the second power mode than the first power mode; and updating the stored media information based on the update.

2. The method of claim 1, further comprising:

identifying the content source associated with media information included in the update; and cross-referencing the identified content source with a database of weights to retrieve a weight that is associated with the identified content source, wherein the second weight for the update is assigned based on the retrieved weight.

3. The method of claim 1, further comprising:

receiving input from a user that assigns a preference level to each of a plurality of different updates;

storing as the data the preference level for each of the plurality of updates; and computing the second weight for the received update based on the respective assigned preference level, wherein the second weight for the update is assigned based on the computed weight.

4. The method of claim 3, wherein each assigned preference level indicates a preference for at least one of:

a genre of media information included in the updates, a media format of media information included in the updates, a content source associated with media information included in the updates, and a media asset associated with media information included in the updates.

5. The method of claim 1, further comprising:

in response to determining that the second weight does not exceed the threshold value, postponing the update by:

storing the update in the storage device without modifying the media information stored on the media equipment device;

monitoring a power state of the media equipment device to determine a next time the media equipment device has switched to the second power mode;

determining that the media equipment device has switched to the second power mode; and in response to determining that the media equipment device has switched to the second power mode, modifying the media information stored on the storage device based on the stored update.

6. The method of claim 5, wherein the media equipment device switches to the second power mode the next time in response to at least one of:

requesting, from a user input, that the media equipment device be switched to the second power mode, receiving a message, from a remote server, indicating when the media equipment device should be switched to the second power mode, and performing a previously scheduled recording on the media equipment device.

7. The method of claim 1, wherein the threshold value is determined based on a characteristic of the media equipment device that is related to power consumption of the media equipment device, and wherein a higher level of power consumption corresponds to a higher threshold value.

8. The method of claim 1, wherein the threshold value is determined dynamically based on a current quantity of the media information stored on the media equipment device, wherein;

the quantity is measured by at least one of a size of storage space occupied by the media information on the media equipment device and a period of time during which the media information is accessible to users of the media equipment device; and a higher quantity corresponds to a higher threshold value.

9. A system for operating a media equipment device, the system comprising control circuitry configured to:

receive an update to media information stored on the media equipment device, wherein the media information is associated with a content source;

determine a viewing history of each content source from a plurality of content sources available to the media equipment device;

rank each content source from the plurality of content sources based on the respective determined viewing history;

compute a weight for each content source from the plurality of content sources based on the respective ranking, retrieve data from a storage device that identifies a first weight for the update;

assign a second weight for the update based on the retrieved data and on the computed weight of the content source associated with the media information that is subject to the update;

retrieve from the storage device a threshold value;

determine whether the second weight exceeds the retrieved threshold value;

in response to determining that the second weight exceeds the threshold value, switch the media equipment device from a first power mode of operation to a second power mode of operation, wherein the media equipment device consumes more power when operating in the second power mode than the first power mode; and update the stored media information based on the update.

10. The system of claim 9, wherein the control circuitry is further configured to:

identify the content source associated with media information included in the update; and cross-reference the identified content source with a database of weights to retrieve a weight that is associated with the identified content source, wherein the second weight for the update is assigned based on the retrieved weight.

11. The system of claim 9, wherein the control circuitry is further configured to:

receive input from a user that assigns a preference level to each of a plurality of different updates;

store as the data the preference level for each of the plurality of updates; and compute the second weight for the received update based on the respective assigned preference level, wherein the second weight for the update is assigned based on the computed weight.

12. The system of claim 11, wherein each assigned preference level indicates a preference for at least one of:
   a genre of media information included in the updates,
   a media format of media information included in the updates,
   a content source associated with media information included in the updates,
   and a media asset associated with media information included in the updates.

13. The system of claim 9, wherein the control circuitry is further configured to:
   in response to determining that the second weight does not exceed the threshold value, postpone the update by:
   storing the update in the storage device without modifying the media information stored on the media equipment device;
   monitoring a power state of the media equipment device to determine a next time the media equipment device has switched to the second power mode;
   determining that the media equipment device has switched to the second power mode; and
   in response to determining that the media equipment device has switched to the second power mode, modifying the media information stored on the storage device based on the stored update.

14. The system of claim 13, wherein the control circuitry is configured to switch the media equipment device to the second power mode the next time in response to at least one of:
   requesting, from a user input, that the media equipment device be switched to the second power mode,
   receiving a message, from a remote server, indicating when the media equipment device should be switched to the second power mode, and
   perform a previously scheduled recording on the media equipment device.

15. The system of claim 9, wherein the control circuitry is configured to determine the threshold value based on a characteristic of the media equipment device that is related to power consumption of the media equipment device, and wherein a higher level of power consumption corresponds to a higher threshold value.

16. The system of claim 9, wherein the control circuitry is configured to dynamically determine the threshold value based on a current quantity of the media information stored on the media equipment device, wherein;
   the quantity is measured by at least one of a size of storage space occupied by the media information on the media equipment device and a period of time during which the media information is accessible to users of the media equipment device; and
   wherein a higher quantity corresponds to a higher threshold value.

* * * * *